United States Patent
Xu et al.

(10) Patent No.: US 12,376,183 B2
(45) Date of Patent: Jul. 29, 2025

(54) POWER SAVING FOR SDT PROCEDURE

(71) Applicant: Apple Inc., Cupertino, CA (US)

(72) Inventors: Fangli Xu, Beijing (CN); Dawei Zhang, Saratoga, CA (US); Haijing Hu, Los Gatos, CA (US); Naveen Kumar R. Palle Venkata, San Diego, CA (US); Ralf Rossbach, Munich (DE); Sarma V. Vangala, Campbell, CA (US); Sethuraman Gurumoorthy, San Ramon, CA (US); Srirang A. Lovlekar, Fremont, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 609 days.

(21) Appl. No.: 17/440,658

(22) PCT Filed: May 10, 2021

(86) PCT No.: PCT/CN2021/092703
§ 371 (c)(1),
(2) Date: Sep. 17, 2021

(87) PCT Pub. No.: WO2022/236555
PCT Pub. Date: Nov. 17, 2022

(65) Prior Publication Data
US 2023/0224999 A1    Jul. 13, 2023

(51) Int. Cl.
*H04W 76/27* (2018.01)
*H04W 72/0457* (2023.01)
*H04W 72/21* (2023.01)

(52) U.S. Cl.
CPC ....... *H04W 76/27* (2018.02); *H04W 72/0457* (2023.01); *H04W 72/21* (2023.01)

(58) Field of Classification Search
CPC ....... H04W 72/04; H04W 76/27; H04W 8/24; H04W 4/00; H04W 4/70; H04W 60/00;
(Continued)

(56) References Cited

U.S. PATENT DOCUMENTS

2013/0262604 A1* 10/2013 Elzur ............... H04L 41/0816
709/206
2016/0007213 A1* 1/2016 Cui ................... H04W 28/0215
370/230
(Continued)

FOREIGN PATENT DOCUMENTS

CN    104010382    8/2014
CN    108184214    6/2018
(Continued)

OTHER PUBLICATIONS

Work Item on NR small data transmissions in Inactive state, ZTE Corporation, 3GPP TSG RAN Meeting #86, RP-193252, Dec. 9-12, 2019, 4 pages.
(Continued)

*Primary Examiner* — Quan M Hua
(74) *Attorney, Agent, or Firm* — Kilpatrick Townsend & Stockton LLP

(57) ABSTRACT

Provided is a method for a user equipment (UE). The UE generates a first information for the UE for transmission to a network device. The first information is associated with a small data transmission (SDT) procedure in an inactive state of the UE. The UE obtains a first configuration information from the network device. The first configuration information is determined with reference to the first information. The UE determines whether to perform the SDT procedure in the inactive state according to the first configuration information. The UE, in response to determining to perform the SDT procedure in the inactive state, performs the SDT procedure
(Continued)

in the inactive state according to the first configuration information.

20 Claims, 17 Drawing Sheets

(58) Field of Classification Search
CPC ....... H04W 72/23; H04W 74/08; H04W 8/22; H04W 12/04; H04W 12/06; H04W 68/00; H04W 72/00; H04W 72/0457; H04W 72/21; H04W 24/08; H04W 24/10; H04W 28/02; H04W 28/24; H04W 4/06; H04W 4/50; H04W 52/14; H04W 68/02; H04W 72/0453; H04W 72/11; H04W 72/12; H04W 72/30; H04W 76/16; H04W 76/19; H04W 76/20; H04W 8/08; H04W 8/26; H04W 8/28; H04W 88/10; H04L 5/14; H04J 1/16; H04J 3/22
See application file for complete search history.

(56) References Cited

U.S. PATENT DOCUMENTS

| 2017/0041782 | A1* | 2/2017 | Yu | H04W 12/06 |
| 2018/0279375 | A1* | 9/2018 | Jeon | H04W 72/23 |
| 2019/0319686 | A1* | 10/2019 | Chen, IV | H04W 24/08 |
| 2021/0337602 | A1* | 10/2021 | Liu | H04W 76/27 |
| 2023/0030443 | A1* | 2/2023 | Chen | H04W 56/0045 |

FOREIGN PATENT DOCUMENTS

| CN | 110283075 A | 9/2019 | |
| CN | 110583075 | 12/2019 | |
| WO | 2020088097 | 5/2020 | |
| WO | WO-2020191059 A1 * | 9/2020 | ............ H04W 76/19 |

OTHER PUBLICATIONS

3rd Generation Partnership Project; Technical Specification Group Radio Access Network; NR; NR and NG-RAN Overall Description; Stage 2 (Release 16), 3GPP TS 38.300 V16.5.0, Mar. 2021, 151 pages.
3rd Generation Partnership Project; Technical Specification Group Radio Access Network; NR; User Equipment (UE) radio access capabilities (Release 16), 3GPP TS 38.306 V16.4.0, Mar. 2021, 151 pages.
3rd Generation Partnership Project; Technical Specification Group Radio Access Network; NR; Radio Resource Control (RRC) protocol specification (Release 16), 3GPP TS 38.331 V16.4.1, Mar. 2021, 949 pages.
Control Plane Aspects on the SDT Procedure, Apple, 3GPP TSG-RAN WG2 Meeting #113 bis Electronic, R2-2103868, Apr. 20, 2021, 5 pages.
Control Plane Common Aspects for SDT, Huawei, HiSilicon, 3GPP TSG-RAN WG2 #113 bis-e, R2-2103904, Apr. 20, 2021, 15 pages.
International Patent Application No. PCT/CN2021/092703, International Search Report and the Written Opinion, Mailed on Feb. 10, 2022, 9 pages.
International Patent Application No. PCT/CN2021/092703, International Preliminary Report on Patentability, Nov. 23, 2023, 6 pages.
Control Plane Common Aspects for SDT, R2-2103904, 3GPP TSG-RAN WG2 #113bis-e, Apr. 12-20, 2021, 15 pages.
Requirements and Scopes of Small Data Transmission, R2-2006991, 3GPP TSG-RAN WG2 Meeting #111 electronic, Aug. 17-28, 2020, 3 pages.
Some Aspects of User Plane for SDT in NR, R2-2103583, 3GPP TSG-RAN WG2 Meeting #113bis electronic, Apr. 12-20, 2021, 5 pages.
Subsequent Data Transmission for SDT, R2-2103869, 3GPP TSG-RAN WG2 Meeting #113 bis electronic, Apr. 12-20, 2021, 4 pages.
European Patent Application No. 21941131.1, Extended European Search Report, Apr. 24, 2024, 13 pages.
Control Plane Aspects on the SDT Procedure, 3Generation Partnership Project Technical Specification Group-Radio Access Network Working Group2 Meeting #113 bis electronic, R2-2103868, Apr. 12-20, 2021, 4 pages.
Control Plane Common Aspects for SDT, 3Generation Partnership Project Technical Specification Group-Radio Access Network Working Group2 #113bis-e, R2-2103904, Apr. 12-20, 2021, 15 pages.
Requirements And Scopes of Small Data Transmission, 3Generation Partnership Project Technical Specification Group-Radio Access Network Working Group2 Meeting #111 electronic, R2-2006991, Aug. 17-28, 2020, 3 pages.
Some Aspects of User Plane for SDT in NR, 3Generation Partnership Project Technical Specification Group-Radio Access Network Working Group2 Meeting #113bis electronic, R2-2103583, Apr. 12-20, 2021, 5 pages.
Subsequent Data Transmission for SDT, 3Generation Partnership Project Technical Specification Group-Radio Access Network Working Group2 Meeting #113 bis electronic, R2-2103869, Apr. 12-20, 2021, 4 pages.
Chile Patent Application No. 03313-2023, Office Action, Mar. 17, 2025, 13 pages.

* cited by examiner

POWER SAVING FOR SDT PROCEDURE

CROSS-REFERENCES TO RELATED APPLICATIONS

This application is a U.S. National Stage Application of PCT/CN2021/092703 filed May 10, 2021. The disclosure of which is herein incorporated by reference in its entirety for all purposes.

TECHNICAL FIELD

This application relates generally to wireless communication systems, and more specifically to power saving for small data transmission (SDT) procedure.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method for a user equipment (UE) is provided that includes: generating a first information for the UE for transmission to a network device, wherein the first information is associated with a small data transmission (SDT) procedure in an inactive state of the UE; obtaining a first configuration information from the network device, wherein the first configuration information is determined with reference to the first information; determining whether to perform the SDT procedure in the inactive state according to the first configuration information; and in response to determining to perform the SDT procedure in the inactive state, performing the SDT procedure in the inactive state according to the first configuration information.

According to an aspect of the present disclosure, a method for a network device is provided that includes: obtaining a first information for a user equipment (UE) from the UE, wherein the first information is associated with a small data transmission (SDT) procedure in an inactive state of the UE; and generating a first configuration information for transmission to UE, wherein the first configuration information is determined with reference to the first information, and wherein the first configuration information is used for determining whether to perform the SDT procedure in the inactive state by the UE and for configuring the SDT procedure by the UE.

According to an aspect of the present disclosure, an apparatus for a user equipment (UE) is provided that includes one or more processors configured to perform steps of the method according to the present disclosure.

According to an aspect of the present disclosure, an apparatus of a network device is provided that includes one or more processors configured to perform steps of the method according to the present disclosure.

According to an aspect of the present disclosure, a computer readable medium is provided that has computer programs stored thereon, which when executed by one or more processors, cause an apparatus to perform steps of the method according to the present disclosure.

According to an aspect of the present disclosure, an apparatus for a communication device is provided that includes means for performing steps of the method according to the present disclosure.

According to an aspect of the present disclosure, a computer program product is provided that includes computer programs which, when executed by one or more processors, cause an apparatus to perform steps of the method according to the present disclosure.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

In wireless communication, UE may stay in a connected state, an idle state and an inactive state. Usually, UE saves more power energy in the inactive state and costs more power energy in the connected state. Nevertheless, there may be uplink (UL) data to be transmitted when UE is in the inactive state. In this case, UE may be switched to the connected state for data transmission. As another option, for power saving, if UL data to be transmitted is not relatively too large, UE may continue to stay in the inactive state and use a procedure called small data transmission (SDT) procedure, in order to transmit data without state transition (e.g., to the connected state).

In the related art, the SDT procedure is totally controlled by a network device (e.g., any type of base station) and the UE works in the SDT procedure according to the SDT configuration provided by the network device. For example, when the SDT procedure starts, it is the network device that decides when to terminate the SDT procedure, which may cause the waste of power energy.

Figure 1:
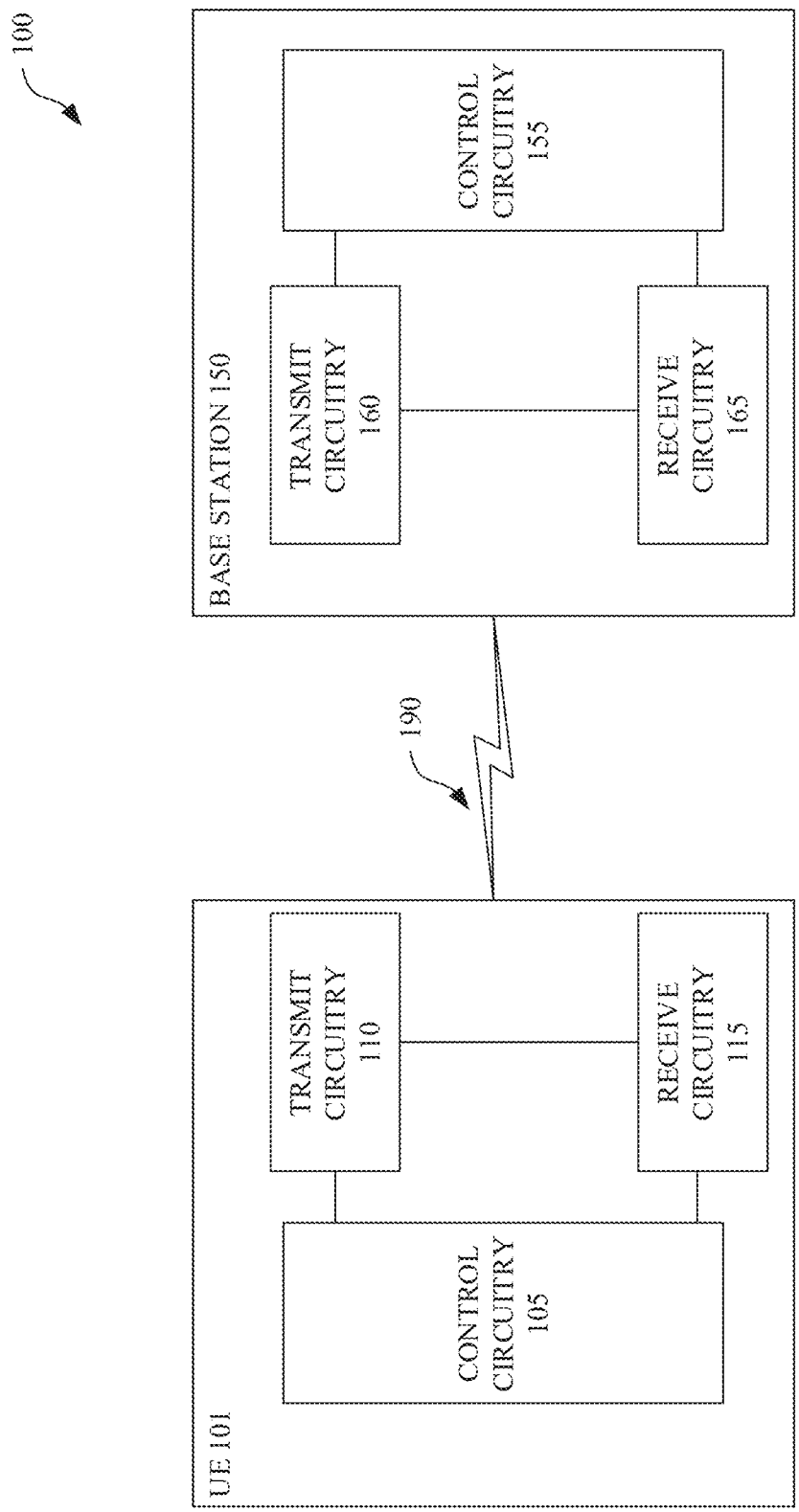
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120-degree area with an array of antennas directed to each sector to provide 360-degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g., messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person-to-person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is included of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is included of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

The UE and the network device described in the following embodiments may be implemented by the UE 101 and the base station 150 described in FIG. 1.

Figure 2:
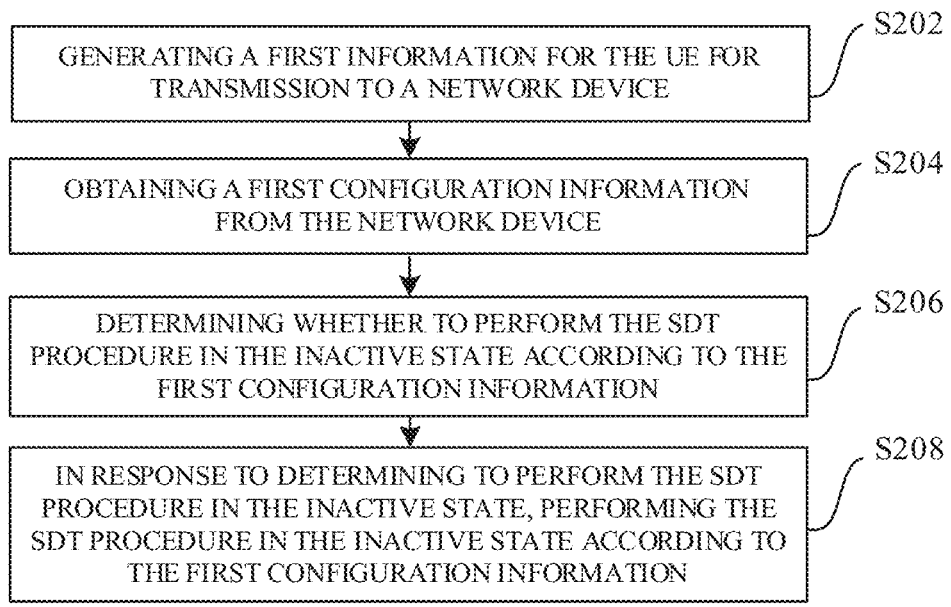
FIG. 2 illustrates a flowchart for an exemplary method for a user equipment in accordance with some embodiments.

FIG. 2 illustrates a flowchart for an exemplary method for a user equipment in accordance with some embodiments. The method 200 illustrated in FIG. 2 may be implemented by the UE 101 described in FIG. 1.

In some embodiments, the method 200 for UE may include the following steps: S202, generating a first information for the UE for transmission to a network device, wherein the first information is associated with a small data transmission (SDT) procedure in an inactive state of the UE; S204, obtaining a first configuration information from the network device, wherein the first configuration information is determined with reference to the first information; S206, determining whether to perform the SDT procedure in the inactive state according to the first configuration information; and S208, in response to determining to perform the SDT procedure in the inactive state, performing the SDT procedure in the inactive state according to the first configuration information.

According to some embodiments of the present disclosure, the UE can report the first information associated with the SDT procedure to the network device, such that the network device can provide the first configuration information with reference to this first information. Then, the UE is also able to determine whether to perform the SDT procedure according to the first configuration information in consideration of the first information, and if it determines to perform the SDT procedure, this SDT procedure can be performed according to the first configuration information in consideration of the first information. In this way, with the first information reported by the UE, the UE can participate in controlling the SDT procedure according to its own situation, which better accords with the actual situation of SDT procedure between the UE and the network device, thereby reducing the waste of power energy and improving the power saving.

In the following, each step of the method 200 will be described in details.

At step S202, the UE generates a first information for the UE for transmission to a network device, wherein the first information is associated with a small data transmission (SDT) procedure in an inactive state of the UE.

Small data transmission (SDT) procedure is used for the transmission of small data when the UE is in the inactive state without state transition (e.g., to a connected state). The size of small data is defined by a threshold size that is well known for those skilled in the art. It should be understood that, the threshold size of "small data" is not an absolute value but is relative to each UE. For example, the threshold size of "small data" relative to a wearable watch may be smaller than the threshold size of "small data" relative to a mobile phone, while the threshold size of "small data" relative to the mobile phone may be smaller than the threshold size of "small data" relative to an industrial Internet of Things (IIOT) device.

According to some embodiments, the UE may be in a connected state, in an idle state or in an inactive state. In some embodiments, the connected state, the idle state and the inactive state may be defined with respect to Radio Resource Control (RRC). For example, the connected state may include an RRC_CONNECTED state, the idle state may include an RRC_IDLE state, and the inactive state may include an RRC_INACTIVE state. However, the present disclosure does not limit to this.

According to some embodiments, the first information may be transmitted from the UE to the network device when the UE has not entered into the inactive state yet (e.g., when the UE is in a connected state). In some embodiments, the first information may be transmitted when the UE is in a connected state. In some embodiments, the first information is transmitted when the UE is in an idle state.

According to some embodiments, the first information may be transmitted from the UE to the network device when the UE has already entered into the inactive state. In some embodiments, the first information may be transmitted upon the arrival of UL data to be transmitted to the network device. For example, the first information may be transmitted along with UL data. As another example, the first information may be transmitted prior to the transmission of UL data. In some embodiments, the first information may be transmitted before the arrival of uplink (UL) data to be transmitted to the network device.

According to some embodiments, the first information generated by the UE may indicates the situation of the UE with respect to SDT procedure. In some embodiments, the first information may include a UE-specific capability for the SDT procedure. In some embodiments, the first information may include a UE-specific preference for the SDT procedure. However, the present disclosure does not limit to this, in some embodiments, the first information may include other parameters associated with the SDT procedure except for the UE-specific capability and the UE-specific preference for the SDT procedure.

In the following, the UE-specific capability and the UE-specific preference for the SDT procedure will be described separately in details. However, it should be that, separate description of the UE-specific capability and the UE-specific preference is just for clarity. In fact, in some embodiments, the first information may include both the UE-specific capability for the SDT procedure and the UE-specific preference for the SDT procedure.

According to some embodiments, the first information for the UE includes a UE-specific capability for the SDT procedure of the UE.

In some embodiments, the UE-specific capability for the SDT procedure of the UE may be reported by the UE to the network device when the UE is in the inactive state. In some embodiments, the UE-specific capability for the SDT procedure of the UE may be reported by the UE to the network device upon the arrival of UL data when the UE is in the inactive state. For example, the UE-specific capability for the SDT procedure may be transmitted along with UL data.

According to some embodiments of the present disclosure, the UE-specific capability for the SDT procedure indicates the capability for the UE in SDT procedure, and thus by receiving a first information including the UE-specific capability for the SDT procedure, the network device may try to provide the first configuration information within the capability for the UE, thereby reducing the probability of repeated configuration and thus improving the power saving.

According to some embodiments, the UE-specific capability for the SDT procedure indicates a type of the SDT procedure supported by the SDT procedure, and wherein the type of the SDT procedure supported by the UE includes at least one of a random access channel (RACH)-based SDT procedure and a configured grant (CG)-based SDT procedure.

In some embodiments, the UE may only support the RACH-based SDT procedure, only support the CG-based SDT procedure, support both the RACH-based SDT procedure and the CG-based SDT procedure, or other types of SDT procedure.

Before receiving the UE-specific capability for the SDT procedure indicating type(s) of the SDT procedure supported by the SDT procedure, the network device may have no idea which type(s) of SDT procedure the UE can support. Therefore, by including this capability in the first information, the UE can inform the network device this capability, such that the network device can generate, for example, the first configuration information related to RACH if the UE supports RACH-based SDT procedure (or generate the first configuration information related to RACH if the UE supports CG-based SDT procedure), thereby reducing unnecessary repeated configuration information and thus improves both the efficiency and the power saving.

According to some embodiments, the UE-specific capability for the SDT procedure indicates a frequency factor supported by the SDT procedure of the UE. According to some embodiments, the frequency factor includes at least one of frequency location, frequency bandwidth and bandwidth part (BWP) for the SDT procedure.

BWP may include initial BWP and other BWPs. Initial BWP may refer to a center band of a wider band, which is used for broadcasting and paging. In some embodiments, the UE-specific capability for the SDT procedure may indicate that the UE only supports initial BWP, which means the SDT procedure can only be performed on the initial BWP. In some embodiments, the UE-specific capability for the SDT procedure may indicate that the UE supports both initial BWP and other BWPs in the wider band, which means the SDT procedure can be performed not only on the initial BWP but on the other BWPs.

According to some embodiments, the UE-specific capability for the SDT procedure may indicates one or more of other capabilities regarding the beam failure detection (BFD), beam failure recovery (BFR), L1 channel state information (CSI) report, discontinuous reception (DRX), configured grant (CG) transmission and dynamic grant (DG) transmission, etc.

According to some embodiments, the UE-specific capability for the SDT procedure indicates one or more SDT modes supported by the SDT procedure of the UE. According to some embodiments, the one or more SDT modes supported by the SDT procedure are selected from a normal SDT mode, a power efficient SDT mode, and a basic SDT mode, wherein the SDT procedure includes a first SDT phase and a subsequent SDT phase, and wherein: in the normal SDT mode, the UE supports the first SDT phase and the subsequent SDT phase in the SDT procedure, and the UE supports the SDT procedure on an initial bandwidth part (BWP) and other BWPs, in the power efficient SDT mode, the UE supports the first SDT phase and the subsequent SDT phase but a time period for the subsequent SDT phase in the power efficient SDT mode is limited, in the basic SDT mode, the UE only supports the first SDT phase, and the UE only supports the SDT procedure on the initial BWP.

According to some embodiments, in the power efficient SDT mode, the UE supports the first SDT phase and the subsequent SDT phase but a time period for the subsequent SDT phase in the power efficient SDT mode is limited.

In some embodiments, the time period for the subsequent SDT phase in the power efficient SDT mode is shorter than the time period for the subsequent SDT phase in the normal SDT mode. In this case, the power efficient SDT mode saves more power energy than the normal SDT mode due to the limited time period for the subsequent SDT phase in the power efficient SDT mode.

In some embodiments, the time period for the subsequent SDT phase in the power efficient SDT mode is predefined. For example, the time period may be predefined as a very short time period. As another example, the time period may be predefined as 0, which means for the power efficient SDT mode, the SDT procedure may include only the first SDT phase and does not include the subsequent SDT phase.

According to some embodiments, the SDT procedure may include a first SDT phase and a subsequent SDT phase.

According to some embodiments, in the power efficient SDT mode, the UE supports the first SDT phase and the subsequent SDT phase, but the UE only supports the SDT procedure on the initial BWP.

As can be seen from the above discussion about the normal SDT mode, the power efficient SDT mode and the basic SDT mode, the power efficient SDT mode saves more power energy than the normal SDT mode, because it needs less frequency resources (only on initial BWP), and the basic SDT mode saves more power energy than the power efficient SDT mode, because in the basic SDT mode, the SDT procedure only include the first SDT phase and does not include the subsequent SDT phase and meanwhile the basic SDT mode needs less frequency resources (only on initial BWP).

In some embodiments, the first SDT phase may start from the transmission of UL data and a request for resume (for example, RRCResumeReq in RRC) from the UE to the network device (which may also be the beginning of the SDT procedure in some embodiments). In some embodiments, the first SDT phase may end upon receipt of an acknowledgement from the network device to the UE. However, it should be understood that, for different SDT modes and different types of SDT procedure, the beginning and the end of the first SDT phase can be different, which will be described later herein.

In some embodiments, the subsequent SDT phase may start from the receipt of an acknowledgement information from the network device to the UE and end upon receipt of a release information (for example, RRCRelease in RRC in some embodiments) from the network device to the UE (which is also the end of the SDT procedure). In some embodiments, upon receipt of the release information from the network device to the UE, the UE may enter into the inactive state without SDT procedure.

According to some embodiments of the present disclosure, by introducing one or more SDT modes supported by the UE included in the first information, the UE can tell the network device its capability of the supported SDT mode(s), and thus the network device can configure the SDT procedure with reference to the SDT mode(s) supported by the UE. In addition, compared with specific capabilities included in the first information, indicating the one or more SDT modes supported by the UE included in the first information costs less bits. For example, if there is three SDT modes in total (for example, including the normal SDT mode, the power efficient SDT mode, and the basic SDT mode), then only two bits is needed for indicating the one or more SDT modes supported by the UE included in the first information.

Hereinafter, the basic SDT mode will be described in details.

As discussed above, for different SDT modes and different types of SDT procedure, the beginning and the end of the first SDT phase can be different.

According to some embodiments, if the SDT procedure is a random access channel (RACH)-based SDT procedure, the first SDT phase is considered to be completed when a RACH procedure is completed.

According to some embodiments, in the basic SDT mode, for RACH-based SDT procedure, when the RACH procedure is successful, UE may regard the first SDT phase is successfully completed. Meanwhile, the UE does not support the subsequent data transmission. In some embodiments, if the RACH procedure is a two-step RACH procedure (for example, including Msg-A and Msg-B), the first SDT phase is successfully completed when the two-step RACH procedure is successful. In some embodiments, if the RACH procedure is a four-step RACH procedure (for example, including Msg-A, Msg-B, Msg-C, Msg-D), the first SDT phase is successfully completed when the four-step RACH procedure is successful.

According to some embodiments, if the SDT procedure is a configured grant (CG)-based SDT procedure, the first SDT phase is considered to be completed when a CG transmission is completed.

According to some embodiments, in the basic SDT mode, for CG-based SDT procedure, when the CG transmission (including HARQ retransmission) is successful, UE may regard the first SDT phase is successfully completed. Meanwhile, the UE does not support the subsequent SDT phase.

According to some embodiments, if the first SDT phase is not successfully completed, UE will follow a SDT failure procedure. For example, in the SDT failure procedure, the UE may be switched to the inactive state. As another example, in the SDT failure procedure, the UE may be switched to the idle state.

It should be understood that, although in the basic SDT mode, the SDT procedure includes only the first SDT phase and does not include the subsequent SDT phase, the completion of the first SDT phase does not necessarily mean the termination of the SDT procedure for the basic SDT mode.

Figure 3A:
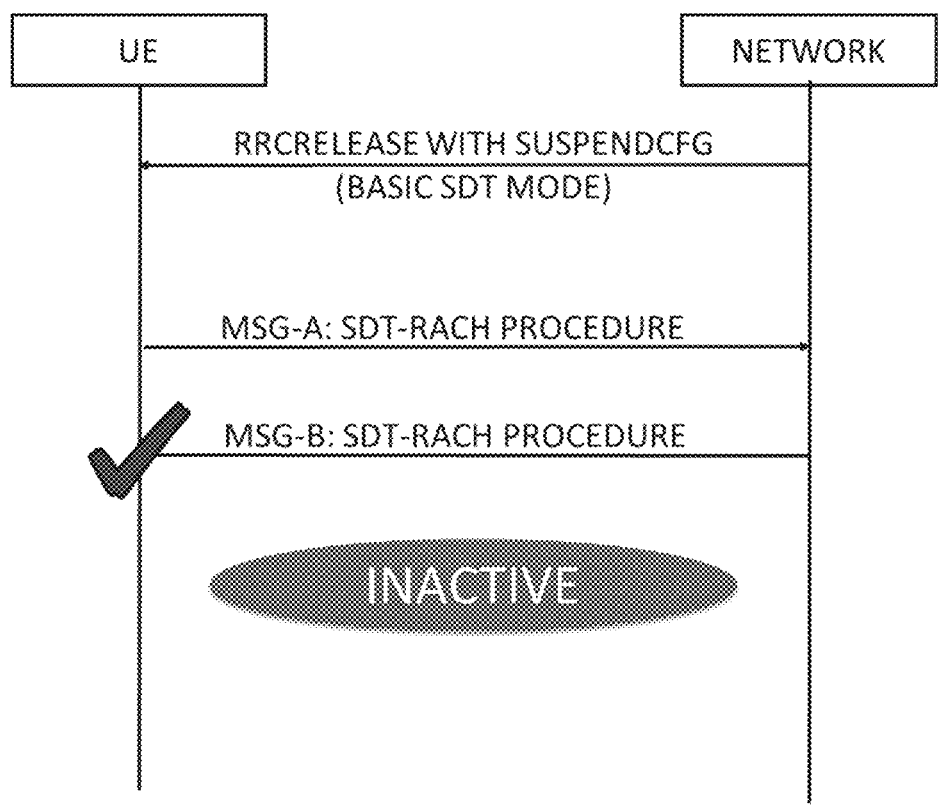
FIG. 3A illustrate a flowchart for exemplary steps for an exemplary basic SDT mode in accordance with some embodiments.

According to some embodiments, in the basic SDT mode, when the first SDT phase is successfully completed, UE may regard the SDT procedure for the basic SDT mode is successfully completed. Hereinafter, an exemplary method regarding the SDT procedure for the basic SDT mode is described with reference to FIG. 3A. FIG. 3A illustrate a flowchart for exemplary steps for an exemplary basic SDT mode in accordance with some embodiments.

As can be seen, FIG. 3A shows an exemplary SDT procedure for the basic SDT mode, wherein the SDT procedure is based on a two-step RACH procedure. For example, after receiving a RRC message (e.g., RRCRelease) with suspend configuration (e.g., SuspendCfg) indicating a basic SDT mode, the UE may enter into the inactive state. When the UE stays in the inactive state, upon the arrival of UL data to be transmitted to the network device, the SDT procedure for the basic SDT mode begins and the UE transmits a Msg-A of the RACH procedure to the network device. Then, the network device transmits a Msg-B of the RACH procedure to the UE. Upon receipt of the Msg-B from the network device, the UE may regard the first SDT phase is successfully completed and meanwhile regard the SDT procedure for the basic SDT mode is successfully completed.

According to some embodiments, in the basic SDT mode, when the first SDT phase is successfully completed, the UE may wait for a first period for the termination of the SDT procedure.

According to some embodiments, the termination of the SDT procedure may be triggered by a RRC message (e.g., RRCRelease) transmitted from the network device to the UE. In some embodiments, the message may request UE to return to the inactive state without SDT procedure. In other embodiments, the message may request UE to enter into the idle state or the connected state.

According to some embodiments, the first period may be predetermined, for example, according to a predefined protocol. According to some embodiments, the first period may be configured by the network device. For example, the first period may be 0.1 s, 0.2 s, 0.5 s or 1 s, but the present disclosure does not limit to this.

Figure 3B:
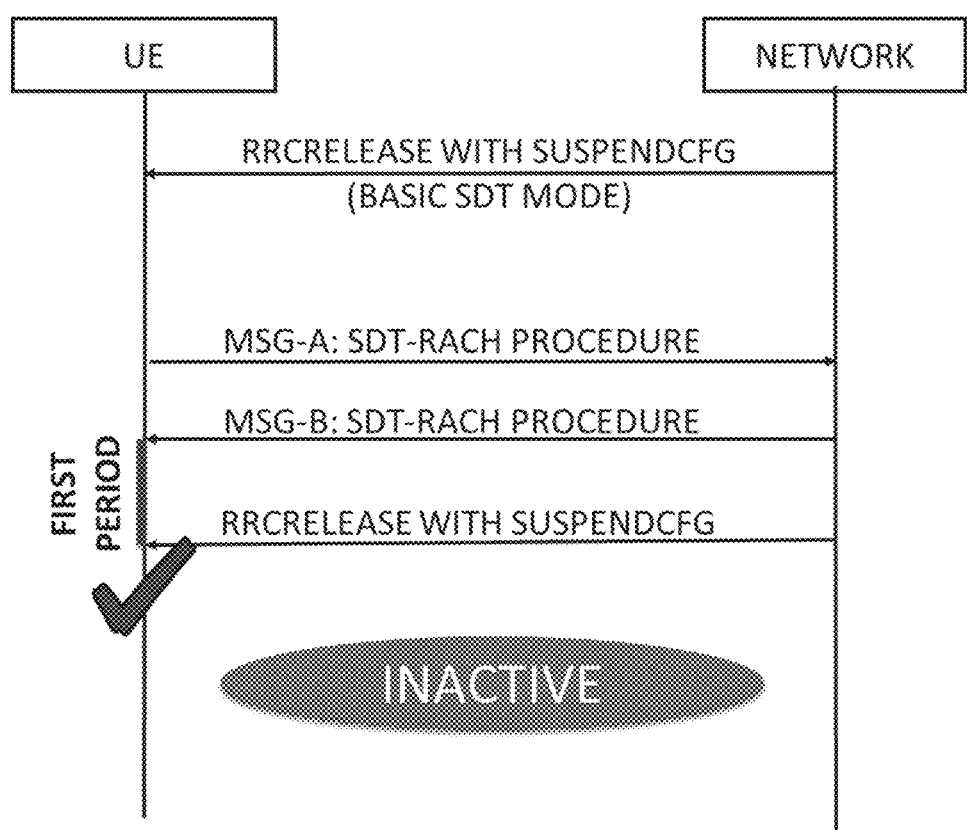
FIG. 3B illustrates a flowchart for exemplary steps for another exemplary basic SDT mode in accordance with some embodiments.

Hereinafter, another exemplary method regarding the SDT procedure for the basic SDT mode is described with reference to FIG. 3B. FIG. 3B illustrates a flowchart for exemplary steps for another exemplary basic SDT mode in accordance with some embodiments.

As can be seen, FIG. 3B shows an exemplary SDT procedure for the basic SDT mode, wherein the SDT procedure is based on a two-step RACH procedure. The two-step RACH procedure in FIG. 3B is the same as that in FIG. 3A, and thus the same description is omitted for clarity. Compared with the SDT procedure shown in FIG. 3A, upon receipt of the Msg-B from the network device, the SDT procedure for the basic SDT mode is not terminated. Instead, the UE waits for a first period for the termination of the SDT procedure triggered by a RRC message (e.g., RRCRelease) with suspend configuration (e.g., SuspendCfg). As shown in FIG. 3B, the UE receives the RRC message transmitted from the network device in the first period, and then the SDT procedure for the basic SDT mode is terminated upon receipt of the RRC message.

Figure 3C:
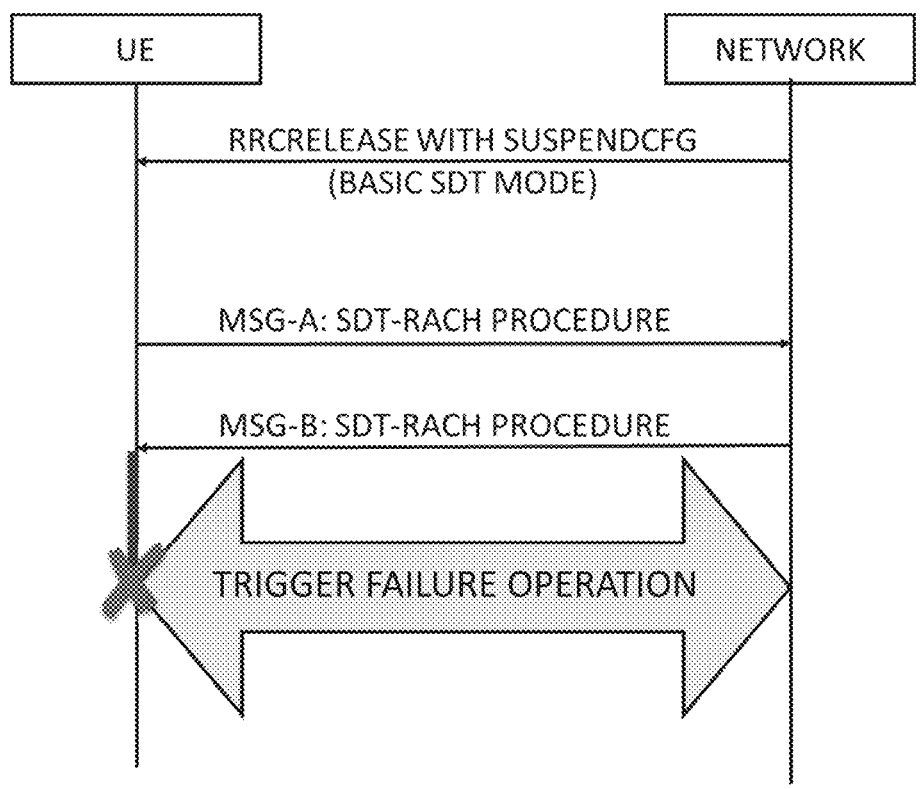
FIG. 3C illustrates a flowchart for exemplary steps for yet another exemplary basic SDT mode in accordance with some embodiments.

However, in some cases, the UE may not receive the RRC message transmitted from the network device in the first period. Hereinafter, another exemplary method regarding the SDT procedure for the basic SDT mode is described with reference to FIG. 3C. FIG. 3C illustrates a flowchart for exemplary steps for yet another exemplary basic SDT mode in accordance with some embodiments.

As can be seen, FIG. 3C shows an exemplary SDT procedure for the basic SDT mode, wherein the SDT procedure is based on a two-step RACH procedure. The two-step RACH procedure in FIG. 3C is the same as that in FIG. 3B, and thus the same description is omitted for clarity. Compared with the SDT procedure shown in FIG. 3B, the UE does not receive the RRC message transmitted from the network device in the first period. In some embodiments, the UE may trigger a RRC reestablishment procedure or a RRC resume procedure for entering into a connected state. In some embodiments, the UE may follow the SDT failure procedure. As discussed above, for example, in the SDT failure procedure, the UE may be switched to the inactive state. As another example, in the SDT failure procedure, the UE may be switched to the idle state.

According to some embodiments of the present disclosure, by introducing a basic SDT mode for the UE, only the first SDT phase is included in the SDT procedure, and thus the time period for a UE to be in the SDT procedure can be reduced, thereby further improving the power saving.

According to some embodiments, the UE-specific capability for the SDT procedure indicates a type of the UE from a plurality of types of the UE.

According to some embodiments, the type of the UE corresponds to a UE-specific SDT configuration.

According to some embodiments, the UE-specific SDT configuration is specific to the type of the UE, which means if the type the UE is indicated, then the SDT configuration that is specific to this type of the UE can be known.

According to some embodiments of the present disclosure, compared with specific capabilities included in the first information, including the type of the UE that corresponds to the UE-specific SDT configuration costs less bits, because the number of types of the UE is very limited. For example, if there are 32 types of the UE in total, then 5 bits is needed. As another example, if there are 16 types of the UE in total, then only 4 bits is needed.

According to some embodiments, the UE-specific SDT configuration may include one or more SDT modes supported by the SDT procedure, wherein the one or more SDT modes supported by the SDT procedure are selected from a normal SDT mode, a power efficient SDT mode, and a basic SDT mode, wherein the SDT procedure includes a first SDT phase and a subsequent SDT phase, and wherein: in the normal SDT mode, the UE supports the first SDT phase and the subsequent SDT phase in the SDT procedure, and the UE supports the SDT procedure on an initial bandwidth part (BWP) and other BWPs, in the power efficient SDT mode, the UE supports the first SDT phase and the subsequent SDT phase but a time period for the subsequent SDT phase in the power efficient SDT mode is limited, in the basic SDT mode, the UE only supports the first SDT phase, and the UE only supports the SDT procedure on the initial BWP.

According to some embodiments, the type of the UE may include a wearable UE, a mobile phone, a pad, a tablet, a laptop, a computer, a vehicle, an industry internet of things (IIOT) UE, etc., but the present disclosure does not limit to this.

According to some embodiments, the type of the UE may correspond to one or more SDT modes supported by the SDT procedure.

In some embodiment, the type of the UE may indicate a wearable UE. For example, the wearable UE may correspond to the basic SDT mode supported by the SDT procedure, which means the wearable UE supports the basic SDT mode. As another example, the wearable UE may correspond to the basic SDT mode and the power efficient SDT mode supported by the SDT procedure, which means the wearable UE supports both the basic SDT mode and the power efficient SDT mode. In some embodiment, the wearable UE may not support the normal SDT mode because it is more sensitive the consumption of power energy.

In some embodiment, the type of the UE may indicate a IIOT UE. For example, the IIOT UE may correspond to the normal SDT mode supported by the SDT procedure, which means the IIOT UE supports the normal SDT mode. In some embodiment, the IIOT UE may not support the basic SDT mode or the power efficient SDT mode, because the IIOT UE is less sensitive the consumption of power energy.

According to some embodiments of the present disclosure, by including the type of the UE in the first information and with the correspondence between the type of the UE and the one or more SDT modes supported by the UE, the UE can inform the network device the type of the UE, and the network device can configure the SDT procedure according to the type of the UE that corresponds to the one or more SDT modes supported by the UE.

According to some embodiments, the first information for the UE includes a UE-specific preference for the SDT procedure.

According to some embodiments, any information included in the UE-specific capability for the SDT procedure can also be included in the UE-specific preference for the SDT procedure. However, it should be understood that, the UE-specific preference for the SDT procedure is not equivalent to the UE-specific capability for the SDT procedure, because it is just a parameter indicating the preference rather than the capability. For example, the UE-specific preference for the SDT procedure may indicate a basic SDT mode, but this does not mean the UE is only capable of supporting the basic SDT mode. This UE may also support the power efficient SDT mode and/or the normal SDT mode, but it prefers the basic SDT mode.

According to some embodiments of the present disclosure, by including the UE-specific preference for the SDT procedure, the UE can inform the network the preference of UE, and the network can configure the SDT procedure with reference to this preference, thereby better according with the UE's situation and improving the SDT procedure.

According to some embodiments, the SDT procedure includes a first SDT phase and a subsequent SDT phase, and wherein the UE-specific preference for the SDT procedure indicates a preferred time period for the subsequent SDT phase.

In some embodiments, the preferred time period for the subsequent SDT phase may be transmitted from the UE to the network device when the UE is in the connected state. In some embodiments, the preferred time period for the subsequent SDT phase may be transmitted from the UE to the network device when the UE is in the inactive state. In other embodiments, the preferred time period for the subsequent SDT phase may be transmitted from the UE to the network device during the SDT procedure.

According to some embodiments of the present disclosure, by indicating a preferred time period for the subsequent SDT phase in the first information, the UE can inform the network device the time period that the UE prefers to stay in the SDT procedure, and the network device is able to be suggested to trigger the termination of the SDT procedure based on the preferred time period, thereby better according with the UE's situation and improving the power saving.

According to some embodiments, the UE-specific preference for the SDT procedure indicates the UE's preference of leaving the SDT procedure or staying in the SDT procedure.

In some embodiments, the UE's preference of leaving the SDT procedure or staying in the SDT procedure may be transmitted from the UE to the network device when the UE is in the connected state. In some embodiments, UE's preference of leaving the SDT procedure or staying in the SDT procedure may be transmitted from the UE to the network device when the UE is in the inactive state. In other embodiments, the UE's preference of leaving the SDT procedure or staying in the SDT procedure may be transmitted from the UE to the network device during the SDT procedure.

According to some embodiments, upon the arrival of UL data, the UE may prefer to stay in the SDT procedure. According to some embodiments, upon the arrival of UL data, the UE may prefer to leave the SDT procedure and prefer to transmit UL data in the connected state rather than in the inactive state.

According to some embodiments of the present disclosure, by indicating UE's preference of leaving the SDT procedure or staying in the SDT procedure in the first information, the UE can inform the network device this preference, then the network device is able to be suggested to configure the SDT procedure with reference to this preference, thereby better according with the UE's situation and improving the data transmission when the UE is in the inactive state.

According to some embodiments, the UE-specific preference for the SDT procedure indicates a SDT mode preferred by the SDT procedure of the UE, wherein the SDT mode preferred by the SDT procedure is selected from a normal SDT mode, a power efficient SDT mode, and a basic SDT mode, wherein the SDT procedure includes a first SDT phase and a subsequent SDT phase, and wherein: in the normal SDT mode, the UE supports the first SDT phase and the subsequent SDT phase in the SDT procedure, and the UE supports the SDT procedure on an initial bandwidth part (BWP) and other BWPs, in the power efficient SDT mode, the UE supports the first SDT phase and the subsequent SDT phase but a time period for the subsequent SDT phase in the power efficient SDT mode is limited, in the basic SDT mode, the UE only supports the first SDT phase, and the UE only supports the SDT procedure on the initial BWP.

In some embodiments, the UE's preference of the SDT mode may be transmitted from the UE to the network device when the UE is in the connected state. In some embodiments, the UE's preference of the SDT mode may be transmitted from the UE to the network device when the UE is in the inactive state. In other embodiments, the UE's preference of the SDT mode may be transmitted from the UE to the network device during the SDT procedure.

According to some embodiments of the present disclosure, by introducing one or more SDT modes preferred by the UE included in the first information, the UE can tell the network device its preference of the SDT mode(s), and thus the network device can configure the SDT procedure with reference to the SDT mode(s) preferred by the UE, thereby better according with the UE's preference and improving the SDT procedure. In addition, only two bits is needed for indicating the one or more SDT modes preferred by the UE included in the first information.

According to some embodiments, the UE-specific preference for the SDT procedure indicates a traffic pattern of uplink data to he transmitted by the UE.

In some embodiments, the traffic pattern may include the frequency of the upcoming arrival of UL data to be transmitted. In some embodiments, the traffic pattern may include the data amount (i.e., data size) of UL data to be transmitted. In some embodiments, the traffic pattern may include the pattern of scheduling of UL data to be transmitted. The present disclosure does not limit to this, the traffic pattern may include other information about uplink data to be transmitted.

According to some embodiments of the present disclosure, since the UE knows better the traffic pattern of UL data, by indicating the traffic pattern of UL data in the first information, the UE can inform the network device the information about UL data to be transmitted, and the network device can configure the SDT procedure with reference to this traffic pattern, thereby better according with UL data to be transmitted and further improving the power saving.

According to some embodiments, the first information for the UE includes a UE assistance information, and wherein the UE assistance information includes the UE-specific preference for the SDT procedure.

According to some embodiments, the UE assistance information (UAI) is also used in the connected mode. For example, the purpose of the UE assistance information is for the UE to inform the network of at least one of the following: its delay budget report carrying desired increment/decrement in the connected mode DRX cycle length, its overheating assistance information, its IDC assistance information, its preference on DRX parameters for power saving, its preference on the maximum aggregated bandwidth for power saving, its preference on the maximum number of secondary component carriers for power saving, its preference on the maximum number of MIMO layers for power saving, its preference on the minimum scheduling offset for cross-slot scheduling for power saving, its preference on the RRC state, configured grant assistance information for NR sidelink communication, its preference in being provisioned with reference time information.

According to some embodiments of the present disclosure, by including the UE-specific preference for the SDT procedure in the UE assistance information, there is no need to using a new parameter for participating the configuration of SDT procedure.

Steps S204-S208 will be discussed together in the following as they are all associated with the first configuration information. In fact, some of these steps are already discussed in combination with S202 as they are all interacted.

At step S204, the UE obtains a first configuration information from the network device, wherein the first configuration information is determined with reference to the first information.

It should be understood that the first configuration information being determined with reference to the first information is not exactly the same as the first configuration information being determined according to the first information, since "with reference to" is less compulsive compared with "according to". Sometimes, the first configuration information might not be determined according to the first information. For example, as discussed above, the first information may include the UE-specific preference for the SDT procedure, and the specific preference for the SDT procedure merely provides suggestion to the network device rather than compulsive request.

According to some embodiments, the UE, in response to determining that the first configuration information is not determined according to the UE-specific preference for the SDT procedure, the UE may retransmit the UE-specific preference for the SDT procedure to the network device.

However, the network device may not wish to receive the UE-specific preference for the SDT procedure from the UE too frequently. In some embodiments, the network device may configure a prohibit timer to control the frequency of transmitting the UE-specific preference for the SDT procedure from the UE to the network device to reduce the disturbing.

At step S206, the UE determines whether to perform the SDT procedure in the inactive state according to the first configuration information.

As discussed above, since the first configuration information might not be determined according to the first information sometimes, the step S206 of determining whether to perform the SDT procedure in the inactive state according to the first configuration information is introduced in the present disclosure. In this step S206, the UE is capable of determining whether the first configuration information matches its capability (or preference), and only when the result of this determination is yes, the method proceeds to the Step 208.

At step S208, the UE, in response to determining to perform the SDT procedure in the inactive state, performs the SDT procedure in the inactive state according to the first configuration information.

According to some embodiments, the first configuration information indicates a capability for the SDT procedure required by the network device, and wherein determining whether to perform the SDT procedure includes: determining whether the capability for the SDT procedure required by the network device is out of the UE-specific capability for the SDT procedure.

According to some embodiments of the present disclosure, by determining whether the capability for the SDT procedure required by the network device is out of the UE-specific capability for the SDT procedure, the UE can estimate whether the SDT procedure will be successfully completed before performing the SDT procedure, thereby avoiding unnecessary attempt of SDT procedure and thus improving the power saving.

According to some embodiments, the UE, in response to determining that the capability for the SDT procedure required by the network device is out of the UE-specific capability for the SDT procedure, triggers a reestablishment procedure for reporting that the first configuration information is wrong for the UE.

In the following, three examples of reestablishment procedure will be discussed with reference to FIG. 4A-FIG. 4C.

Figure 4A:
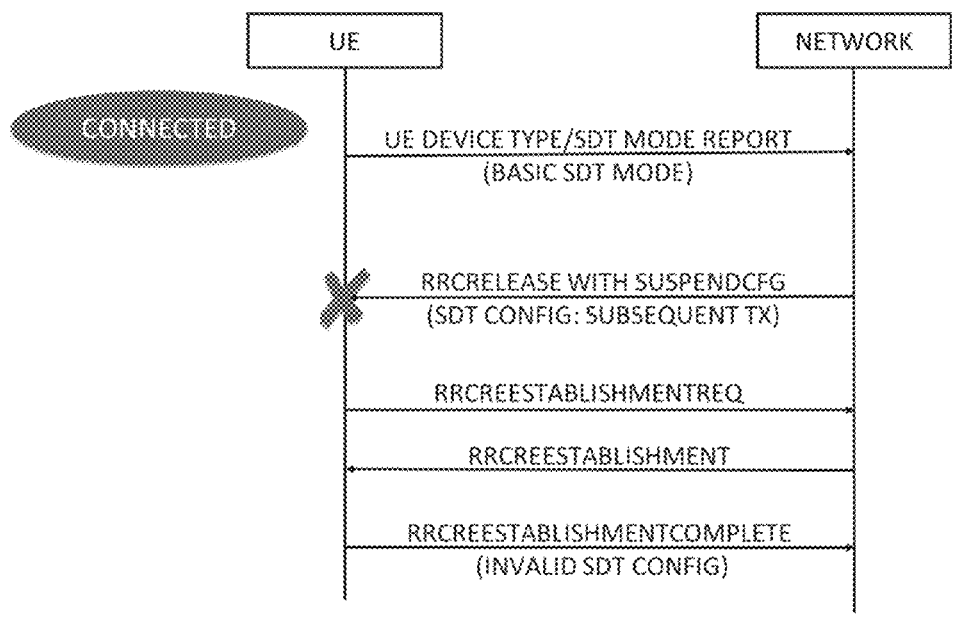
FIG. 4A illustrates a flowchart for exemplary steps for an exemplary reestablishment procedure in accordance with some embodiments.

FIG. 4A illustrates a flowchart for exemplary steps for an exemplary reestablishment procedure in accordance with some embodiments. As can be seen from FIG. 4A, the UE report the first information (e.g., including the type of the UE, one or more SDT modes supported by the UE, etc.) to the network device in the connected mode. In response, the network device transmits the first configuration information included in a first RRC message (e.g., RRCRelease) with suspend configuration (e.g., SuspendCfg) with reference to the first information. However, at step S206, the UE realize that the SDT configuration contained in the first RRC message is wrong (e.g., determining that the capability for the SDT procedure required by the network device is out of the UE-specific capability for the SDT procedure), the UE may not perform the SDT procedure. Instead, the UE requests for a reestablishment procedure by transmitting a second RRC message (e.g., RRCReestablishmentReq) to the network device. In response to the request via the second RRC message, the network device transmits a third RRC message (e.g., RRCReestablishment) to the UE. Then, the UE transmits a fourth RRC message (e.g., RRCReestablishmentCmp) to the network device, wherein the fourth RRC message contains the information indicating that SDT configuration (e.g., included in the first configuration information) is wrong. Upon receipt of the fourth RRC message, the network device can realize that the SDT configuration (e.g., included in the first configuration information) previously provided by itself is wrong.

Figure 4B:
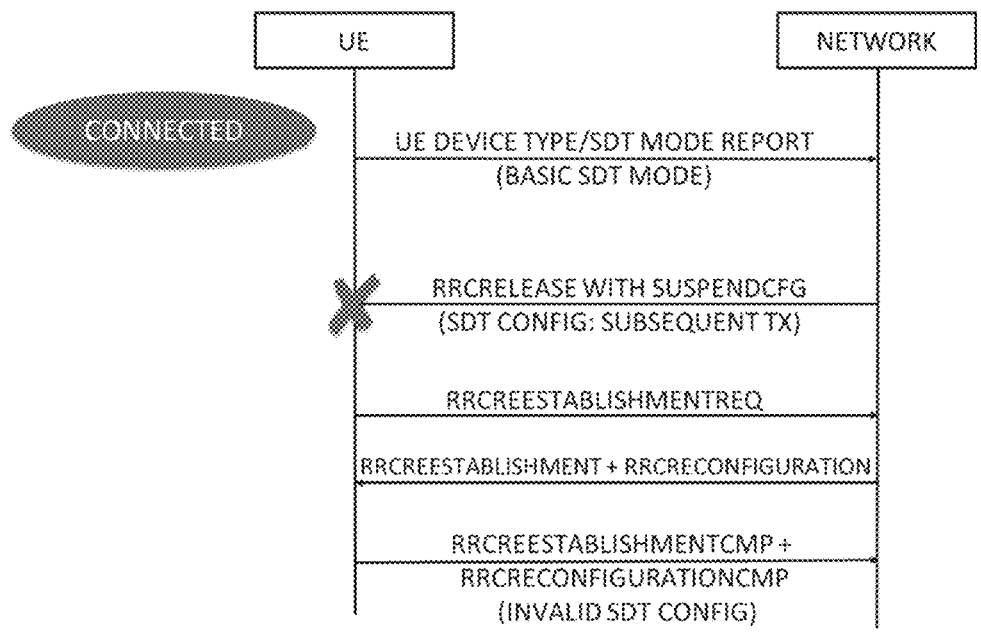
FIG. 4B illustrates a flowchart for exemplary steps for another exemplary reestablishment procedure in accordance with some embodiments.

FIG. 4B illustrates a flowchart for exemplary steps for another exemplary reestablishment procedure in accordance with some embodiments. The steps shown in FIG. 4B is almost the same as those in FIG. 4A, except that another RRC message named RRCReconfiguration is introduced and transmitted from the network device to the UE along with the third RRC message, and another RRC message named RRCReconfigurationCmp is introduced and transmitted from the UE to the network device along with the fourth RRC message wherein the information indicating that SDT configuration (e.g., included in the first configuration information) is wrong is contained in the RRCReconfigurationCmp instead of the fourth RRC message (e.g., RRCReestablishmentCmp) as shown in FIG. 4A.

Figure 4C:
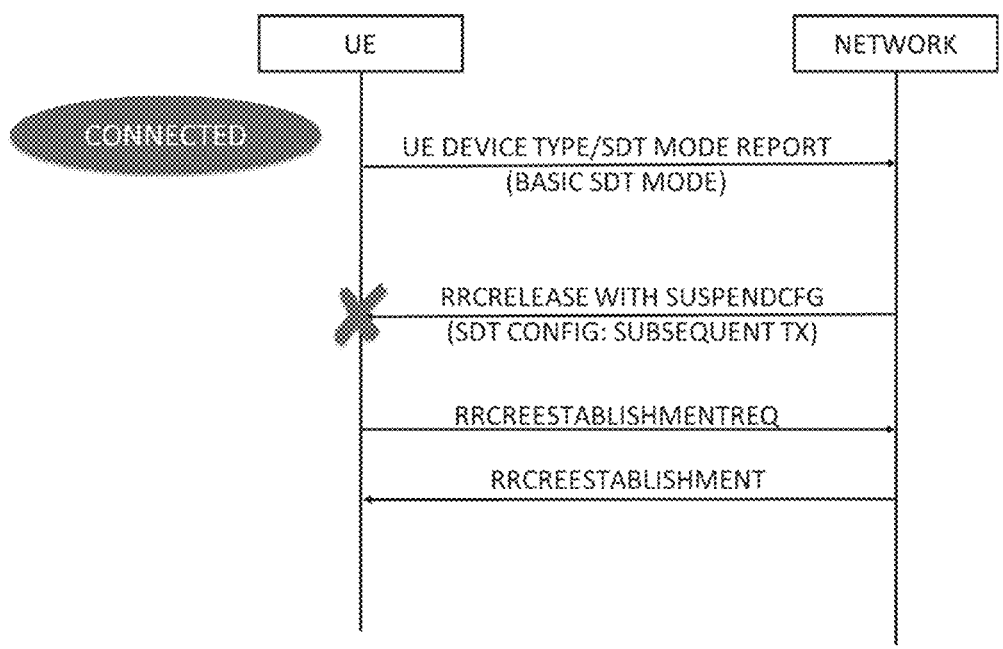
FIG. 4C illustrates a flowchart for exemplary steps for yet another reestablishment procedure in accordance with some embodiments.

FIG. 4C illustrates a flowchart for exemplary steps for yet another reestablishment procedure in accordance with some embodiments. The steps shown in FIG. 4C is almost the same as those in FIG. 4A, except that the UE will not transmits a fourth RRC message to the network device. In this scheme, the network device can realize that the SDT configuration (e.g., included in the first configuration information) previously provided by itself is wrong upon receipt of the second RRC message (e.g., RRCReestablishmentReq). For example, the network device may not expect to receive a request for reestablishment after the transmission of the first RRC message (e.g., RRCRelease), and thus the network device may determine that the SDT configuration is wrong due to receipt of the unexpected request for reestablishment transmitted from the UE.

According to some embodiments of the present disclosure, in response to determining that the capability for the SDT procedure required by the network device is out of the UE-specific capability for the SDT procedure, by triggering a reestablishment procedure, the UE can inform the network device that the capability of the UE may not fulfill with the capability required by the network device, and the network device may provide another SDT configuration for configuring a future SDT procedure, thereby avoiding unsuccessful SDT procedure and thus improving the power saving.

According to some embodiments, the UE, in response to determining that the capability for the SDT procedure required by the network device is out of the UE-specific capability for the SDT procedure, triggers a resume procedure for entering into a connected state of the UE.

In the following, an example of resume procedure will be discussed with reference to FIG. 4D.

Figure 4D:
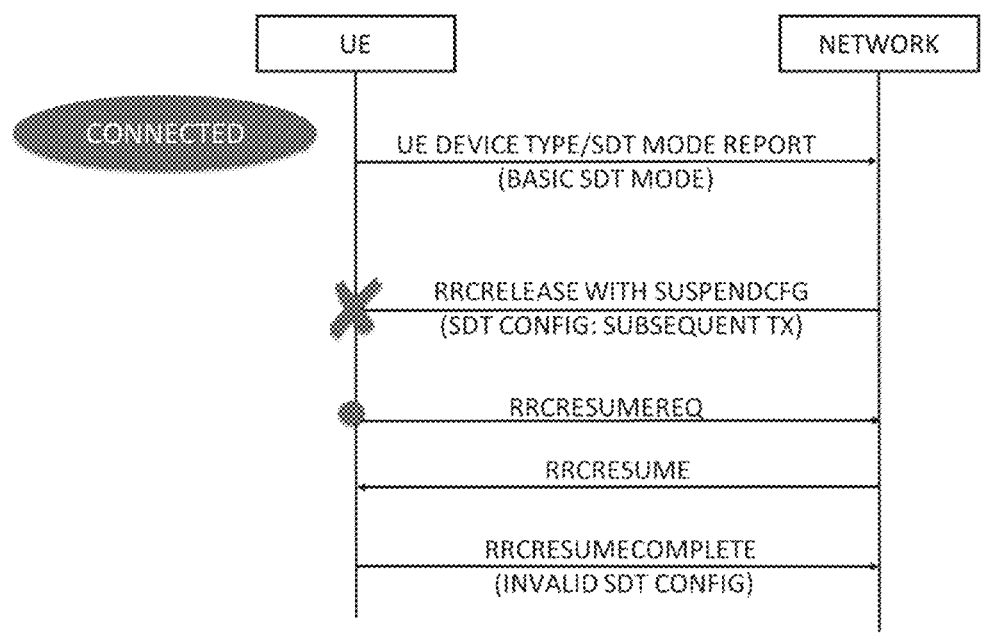
FIG. 4D illustrates a flowchart for exemplary steps for an exemplary resume procedure in accordance with some embodiments.

FIG. 4D illustrates a flowchart for exemplary steps for an exemplary resume procedure in accordance with some embodiments. The steps shown in FIG. 4D is similar to those in FIG. 4A, except that the reestablishment procedure and all RRC messages related to the reestablishment procedure is replaced by the resume procedure and RRC messages related to the resume procedure. Specifically, the second RRC message in FIG. 4D may be a request for resume (e.g., RRCResumeReq), the third RRC message in FIG. 4D may be a resume RRC message (e.g., RRCResume), and the fourth RRC message in FIG. 4D may a RRC message indicating the completion of the resume procedure (e.g., RRCResumeCmp). The UE transmits the fourth RRC message (e.g., RRCReestablishmentCmp) to the network device, wherein the fourth RRC message contains the information indicating that SDT configuration (e.g., included in the first configuration information) is wrong. Upon receipt of the fourth RRC message, the network device can realize that the SDT configuration (e.g., included in the first configuration information) previously provided by itself is wrong.

According to some embodiments of the present disclosure, in response to determining that the capability for the SDT procedure required by the network device is out of the UE-specific capability for the SDT procedure, by triggering a reestablishment procedure, the UE can inform the network device that the capability of the UE may not fulfill with the capability required by the network device and that the UE prefers to transmit UL data in the connected state and would not like to perform the SDT procedure, thereby avoiding unnecessary attempt of performing SDT procedure and improving the power saving.

According to some embodiments, the UE, in response to determining that the capability for the SDT procedure required by the network device is out of the UE-specific capability for the SDT procedure, triggers a release procedure for entering into an idle state of the UE.

According to some embodiments of the present disclosure, in response to determining that the capability for the SDT procedure required by the network device is out of the UE-specific capability for the SDT procedure, by triggering a release procedure, the UE can inform the network device that UE prefers to be switched to the idle state and would not like to perform the SDT procedure, thereby avoiding unnecessary attempt of performing SDT procedure and improving the power saving.

According to some embodiments, the first configuration information indicates a maximum time period for the UE to perform the SDT procedure.

In some embodiments, the maximum time period for the UE to perform the SDT procedure may be configured by the network device with reference to the UE-specific capability for the SDT procedure. In some embodiments, the maximum time period for the UE to perform the SDT procedure may be configured by the network device with reference to the UE-specific preference for the SDT procedure.

According to some embodiments of the present disclosure, by receiving a maximum time period for the UE to perform the SDT procedure provided by the network device, the time period in the SDT procedure is constrained. When exceeding the maximum time period, the UE can automatically terminate the SDT procedure, thereby avoiding unnecessary waste of power and further improving the power saving.

According to some embodiments, determining whether to perform the SDT procedure includes: predicting a potential time period for the UE to perform the SDT procedure based on a traffic pattern of uplink data to be transmitted by the UE; and determining whether the potential time period is longer than the maximum time period.

According to some embodiments of the present disclosure, since the arrival of UL data is occur at the UE, the UE has a better knowledge of UL data to be transmitted to the network device than the network device does, and therefore by predicting a potential time period for the UE to perform the SDT procedure based on a traffic pattern of uplink data, the UE can determine whether the maximum time period provided by the network device is acceptable before performing the SDT procedure, thereby avoiding unnecessary unsuccessful SDT procedure and thus improving the power saving.

According to some embodiments, the UE, in response to determining that the potential time period is longer than the maximum time period, triggers a resume procedure for entering into a connected state of the UE.

In some embodiments, since it is determined that the maximum time period configured by the network device is not enough for transmitting UL data, the UE may decide to trigger a resume procedure entering into a connected state of the UE and transmit UL data in the connected state. In this way, UL data can be transmitted in a more efficient way.

According to some embodiments, the UE in response to determining that the potential time period is not longer than the maximum time period, performs the SDT procedure in the inactive state according to the first configuration information.

In some embodiments, since it is determined that the maximum time period configured by the network device is enough for transmitting UL data, the UE may decide to perform the SDT procedure.

According to some embodiments, the UE configures a timer for monitoring an actual time period to perform the SDT procedure.

In some embodiments, the timer may be used for monitoring an actual time period to perform the SDT procedure. For example, when the timer indicates that the actual time period exceeds the maximum time period (e.g., the expiry of the tinier), the UE may automatically leave the SDT procedure and return to the inactive state without SDT procedure. As another example, when the timer indicates that the actual time period exceeds the maximum time period (e.g., the expiry of the timer), the UE may automatically leave the SDT procedure and may be switched to the idle state if other abnormal cases occur.

In some embodiments, the UE may start the timer at the beginning of the SDT procedure. For example, the UE may start the timer at the beginning of the first SDT phase of the SDT procedure. In some embodiments, the UE may stop the timer upon receiving a message (e.g., RRC message) for terminating the SDT procedure from the network device as discussed above. In some embodiments. the UE may restart the timer upon each first SDT phase of the SDT procedure begins.

In some embodiments, the LIE may start the timer at the beginning of the subsequent SDT phase of the SDT procedure. In some embodiments, the UE may stop the timer upon receiving a message (e.g., RRC message) for terminating the SDT procedure from the network device. In some embodiments, the UE may restart the timer upon each subsequent SDT phase of the SDT procedure begins.

According to some embodiments of the present disclosure, by configuring a timer for an actual time period to perform the SDT procedure, the UE can have better knowledge of the time period used for performing the SDT procedure, and upon the expiry of the time, the UE can leave the SDT procedure, thereby further improving the power saving of the SDT procedure.

Figure 5:
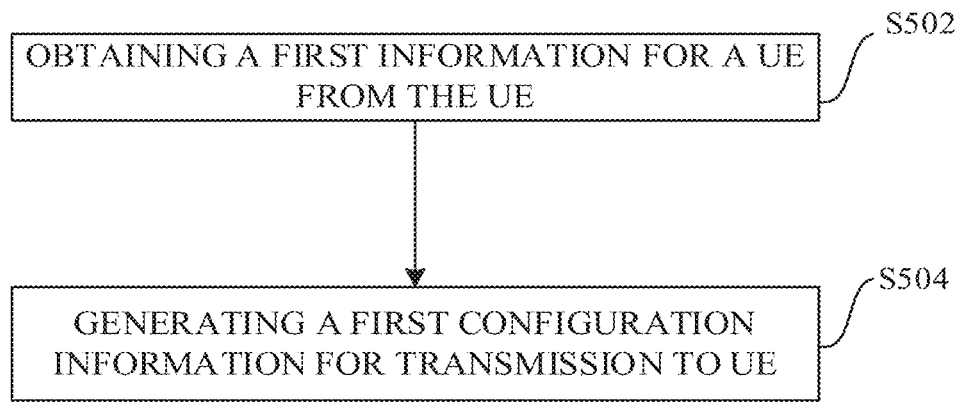
FIG. 5 illustrates a flowchart for an exemplary method for a network device in accordance with some embodiments.

FIG. 5 illustrates a flowchart for an exemplary method for a network device in accordance with some embodiments. The method 500 illustrated in FIG. 5 may be implemented by the base station 150 described in FIG. 1. For example, the network device may be the network device of the base station 150.

In some embodiments, the method 500 for a network device may include the following steps: S502, obtaining a first information for a user equipment (UE) from the UE, wherein the first information is associated with a small data transmission (SDT) procedure in an inactive state of the UE; and S504, generating a first configuration information for transmission to UE, wherein the first configuration information is determined with reference to the first information, and wherein the first configuration information is used for determining whether to perform the SDT procedure in the inactive state by the UE and for configuring the SDT procedure by the UE.

In the following, each step of the method 500 will be described. Note that those elements, expressions, features etc. that have already been described with reference to FIG. 2 and its corresponding description (about UE) are omitted herein for clarity.

At step S502, the network device obtains a first information for a user equipment (UE) from the UE, wherein the first information is associated with a small data transmission (SDT) procedure in an inactive state of the UE.

At step S504, the network device generates a first configuration information for transmission to UE, wherein the first configuration information is determined with reference to the first information, and wherein the first configuration information is used for determining whether to perform the SDT procedure in the inactive state by the UE and for configuring the SDT procedure by the UE.

According to some embodiments of the present disclosure, by receiving a first information associated with the SDT procedure from the UE, the network device can provide the first configuration information regarding the SDT procedure with reference to this first information. In this way, with the first information reported by the UE, the network device can provide the SDT configuration in consideration of UE's situation, which better accords with the actual situation of SDT procedure between the UE and the network device, thereby reducing the waste of power energy and improving the power saving.

Note that those elements, expressions, features etc. that have already been described with reference to FIGS. 3A-3C, 4A-4D and their corresponding description (about UE) are omitted herein for clarity.

According to some embodiments, the first configuration information indicates a maximum time period for the UE to perform the SDT procedure.

According to some embodiments of the present disclosure, by providing a maximum time period for the UE to perform the SDT procedure, the time period in the SDT procedure is constrained. When exceeding the maximum time period, the SDT procedure may be automatically terminated, thereby avoiding unnecessary waste of power and further improving the power saving.

Figure 6:
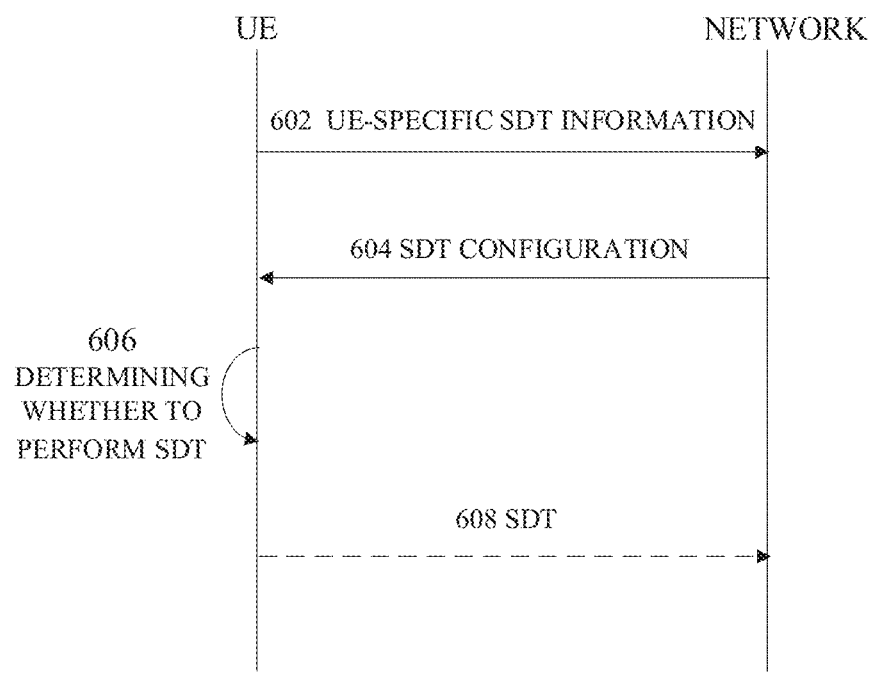
FIG. 6 illustrates a flowchart for exemplary steps for SDT configuration in accordance with some embodiments.

FIG. 6 illustrates a flowchart for exemplary steps for SDT configuration in accordance with some embodiments.

In FIG. 6, the steps of the method for UE and the method for network device during the SDT configuration are shown.

At Step 602, the UE may transmit a UE-specific information associated with SDT to the network device. Step 602 can be implemented according to the description with reference to Step S202 and/or Step S502.

At Step 604, the network device may transmit a SDT configuration to the UE, wherein the SDT configuration may be determined with reference to the UE-specific information associated with SDT. Step 604 can be implemented according to the description with reference to Step S204 and/or Step S504.

At Step 606, the UE may determine whether to perform the SDT procedure according to the SDT configuration provided by the network device. Step 606 can be implemented according to the description with reference to Step S206.

At Step 608, the UE may perform the SDT procedure according to the SDT configuration provided by the network device, in response to determining to perform the SDT procedure according to the SDT configuration provided by the network device in Step 606. Step 608 can be implemented according to the description with reference to Step S208. Note that Step 608 in shown by a dotted line in FIG. 6, because Step 608 may not happen in response to determining not to perform the SDT procedure according to the SDT configuration provided by the network device in Step 606.

Figure 7:
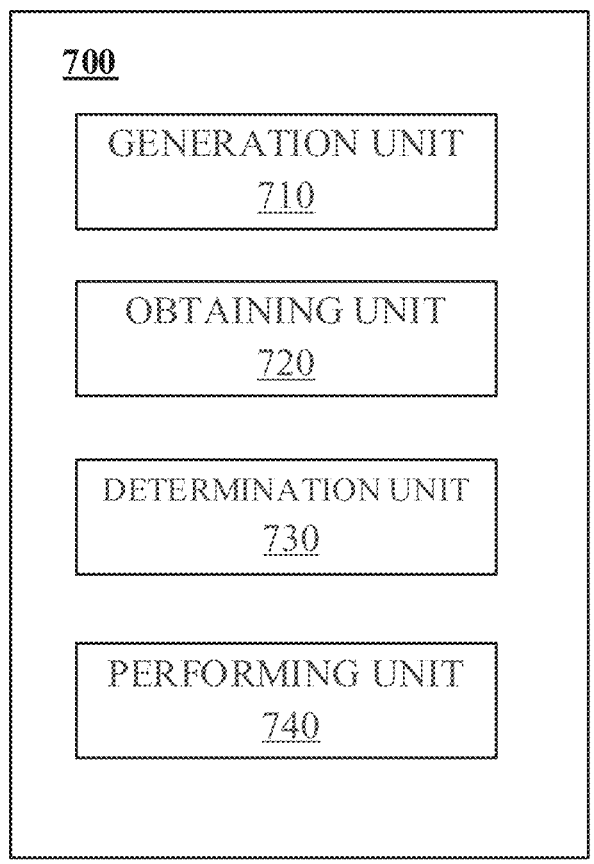
FIG. 7 illustrates an exemplary block diagram of an apparatus for a UE in accordance with some embodiments.

FIG. 7 illustrates an exemplary block diagram of an apparatus for a UE in accordance with some embodiments.

The apparatus 700 illustrated in FIG. 7 may be used to implement the method 200 as illustrated in combination with FIG. 2.

As illustrated in FIG. 7, the apparatus 700 includes a generation unit 710, an obtaining unit 720, a determination unit 730 and a performing unit 740.

The generation unit 710 may be configured to generate a first information for the UE for transmission to a network device, wherein the first information is associated with a small data transmission (SDT) procedure in an inactive state of the UE.

The obtaining unit 720 may be configured to obtain a first configuration information from the network device, wherein the first configuration information is determined with reference to the first information.

The determination unit 730 may be configured to determine whether to perform the SDT procedure in the inactive state according to the first configuration information.

The performing unit 740 may be configured to, in response to determining to perform the SDT procedure in the inactive state, perform the SDT procedure in the inactive state according to the first configuration information.

According to the embodiments of the present application, the UE can report the first information associated with the SDT procedure to the network device, such that the network device can provide the first configuration information with reference to this first information. Then, the UE is also able to determine whether to perform the SDT procedure according to the first configuration information in consideration of the first information, and if it determines to perform the SDT procedure, this SDT procedure can be performed according to the first configuration information in consideration of the first information. In this way, with the first information reported by the UE, the UE can participate in controlling the SDT procedure according to its own situation, which better accords with the actual situation of SDT procedure between the UE and the network device, thereby reducing the waste of power energy and improving the power saving.

Figure 8:
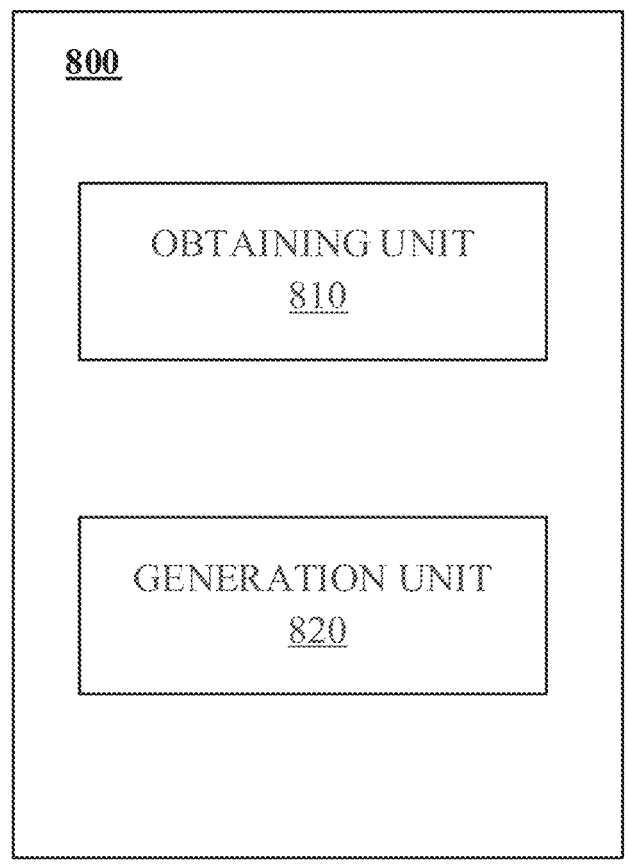
FIG. 8 illustrates an exemplary block diagram of an apparatus for a network device in accordance with some embodiments.

FIG. 8 illustrates an exemplary block diagram of an apparatus for a network device in accordance with some embodiments. The apparatus 800 illustrated in FIG. 8 may be used to implement the method 500 as illustrated in combination with FIG. 5.

As illustrated in FIG. 8, the apparatus 800 includes an obtaining unit 810 and a generation unit 820.

The obtaining unit 810 may be configured to obtain a first information for a user equipment (UE) from the UE, wherein the first information is associated with a small data transmission (SDT) procedure in an inactive state of the UE.

The generation unit 820 may be configured to generate a first configuration information for transmission to UE, wherein the first configuration information is determined with reference to the first information, and wherein the first configuration information is used for determining whether to perform the SDT procedure in the inactive state by the UE and for configuring the SDT procedure by the UE.

According to some embodiments of the present disclosure, by receiving a first information associated with the SDT procedure from the UE, the network device can provide the first configuration information regarding the SDT procedure with reference to this first information. In this way, with the first information reported by the UE, the network device can provide the SDT configuration in consideration of UE's situation, which better accords with the actual situation of SDT procedure between the UE and the network device, thereby reducing the waste of power energy and improving the power saving.

Figure 9:
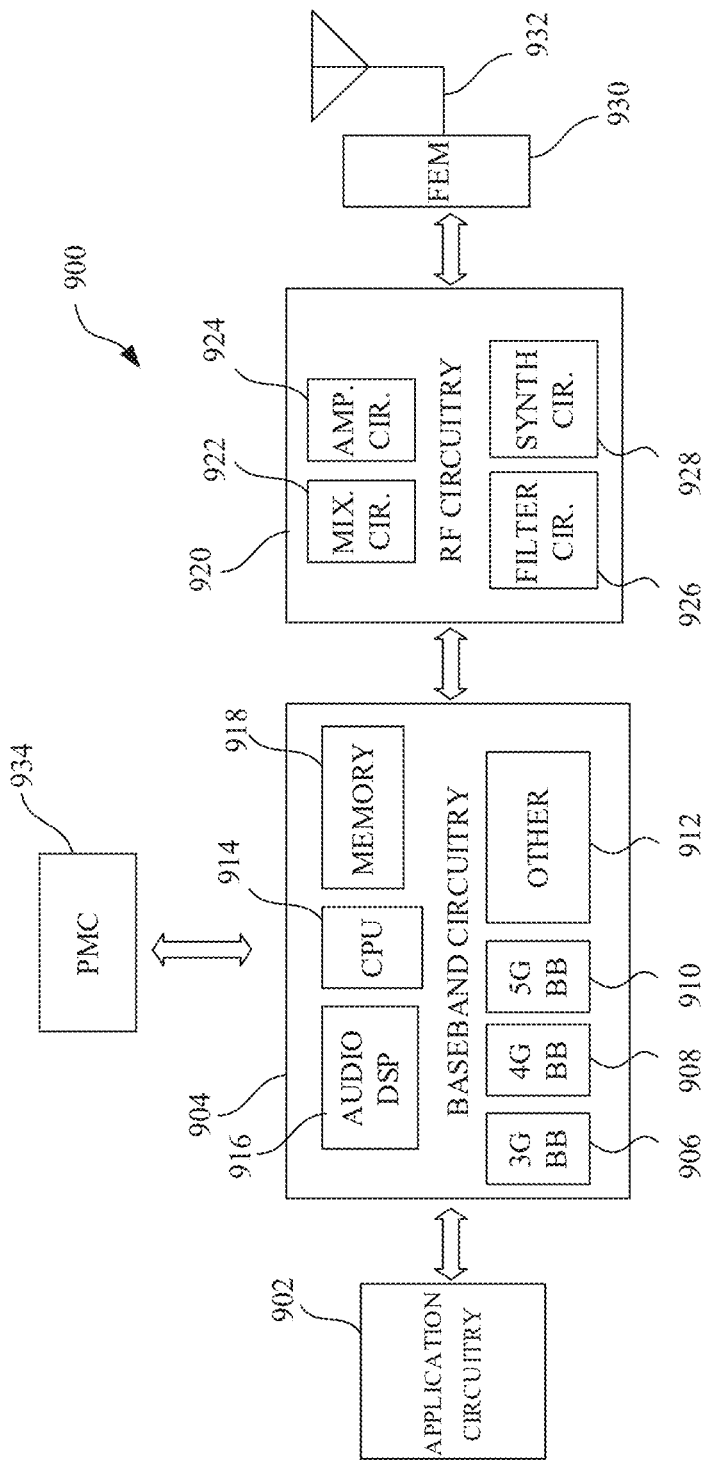
FIG. 9 illustrates example components of a device in accordance with some embodiments.

FIG. 9 illustrates example components of a device 900 in accordance with some embodiments. In some embodiments, the device 900 may include application circuitry 902, baseband circuitry 904, Radio Frequency (RF) circuitry (shown as RF circuitry 920), front-end module (FEM) circuitry (shown as FEM circuitry 930), one or more antennas 932, and power management circuitry (PMC) (shown as PMC 934) coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 920 and to generate baseband signals for a transmit signal path of the RF circuitry 920. The baseband circuitry 904 may interface with the application circuitry 902 for generation and processing of the baseband signals and for controlling operations of the RF circuitry 920. For example, in some embodiments, the baseband circuitry 904 may include a third generation (3G) baseband processor (3G baseband processor 906), a fourth generation (4G) baseband processor (4G baseband processor 908), a fifth generation (5G) baseband processor (5G baseband processor 910), or other baseband processor(s) 912 for other existing generations, generations in development or to be developed in the future (e.g., second generation (2G), sixth generation (6G), etc.). The baseband circuitry 904 (e.g., one or more of baseband processors) may handle various radio control functions that enable communication with one or more radio networks via the RF circuitry 920. In other embodiments, some or all of the functionality of the illustrated baseband processors may be included in modules stored in the memory 918 and executed via a Central Processing ETnit (CPET 914). The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include a digital signal processor (DSP), such as one or more audio DSP(s) 916. The one or more audio DSP(s) 916 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RF circuitry 920 may enable communication with wireless networks using modulated electromagnetic radiation through a non-solid medium. In various embodiments, the RF circuitry 920 may include switches, filters, amplifiers, etc. to facilitate the communication with the wireless network. The RF circuitry 920 may include a receive signal path which may include circuitry to down-convert RF signals received from the FEM circuitry 930 and provide baseband signals to the baseband circuitry 904. The RF circuitry 920 may also include a transmit signal path which may include circuitry to up-convert baseband signals provided by the baseband circuitry 904 and provide RF output signals to the FEM circuitry 930 for transmission.

In some embodiments, the receive signal path of the RF circuitry 920 may include mixer circuitry 922, amplifier circuitry 924 and filter circuitry 926. In some embodiments, the transmit signal path of the RF circuitry 920 may include filter circuitry 926 and mixer circuitry 922. The RF circuitry 920 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RF signals received from the FEM circuitry 930 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 922 of the receive signal path may include passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 930. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 920 may include analog-to-digital converter (ADC) and digital-to-analog converter (DAC) circuitry and the baseband circuitry 904 may include a digital baseband interface to communicate with the RF circuitry 920.

In some dual-mode embodiments, a separate radio IC circuitry may be provided for processing signals for each spectrum, although the scope of the embodiments is not limited in this respect.

In some embodiments, the synthesizer circuitry 928 may be a fractional –N synthesizer or a fractional N/N+1 synthesizer, although the scope of the embodiments is not limited in this respect as other types of frequency synthesizers may be suitable. For example, synthesizer circuitry 928 may be a delta-sigma synthesizer, a frequency multiplier, or a synthesizer including a phase-locked loop with a frequency divider.

The synthesizer circuitry 928 may be configured to synthesize an output frequency for use by the mixer circuitry 922 of the RF circuitry 920 based on a frequency input and a divider control input. In some embodiments, the synthesizer circuitry 928 may be a fractional N/N+1 synthesizer.

In some embodiments, frequency input may he provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 928 of the RF circuitry 920 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 920 may include an IQ/polar converter.

The FEM circuitry 930 may include a receive signal path which may include circuitry configured to operate on RF signals received from one or more antennas 932, amplify the received signals and provide the amplified versions of the received signals to the RF circuitry 920 for further processing. The FEM circuitry 930 may also include a transmit signal path which may include circuitry configured to amplify signals for transmission provided by the RF circuitry 920 for transmission by one or more of the one or more antennas 932. In various embodiments, the amplification through the transmit or receive signal paths may be done solely in the RF circuitry 920, solely in the FEM circuitry 930, or in both the RF circuitry 920 and the FEM circuitry 930.

In some embodiments, the FEM circuitry 930 may include a TX/RX switch to switch between transmit mode and receive mode operation. The FEM circuitry 930 may include a receive signal path and a transmit signal path. The receive signal path of the FEM circuitry 930 may include an LNA to amplify received RF signals and provide the amplified received RF signals as an output (e.g., to the RF circuitry 920). The transmit signal path of the FEM circuitry 930 may include a power amplifier (PA) to amplify input RF signals (e.g., provided by the RF circuitry 920), and one or more filters to generate RF signals for subsequent transmission (e.g., by one or more of the one or more antennas 932).

In some embodiments, the PMC 934 may manage power provided to the baseband circuitry 904. In particular, the PMC 934 may control power-source selection, voltage scaling, battery charging, or DC-to-DC conversion. The PMC 934 may often be included when the device 900 is capable of being powered by a battery, for example, when the device 900 is included in an UE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for, other components such as, but not limited to, the application circuitry 902, the RF circuitry 920, or the FEM circuitry 930.

In some embodiments, the PMC 934 may control, or otherwise be part of, various power saving mechanisms of the device 900. For example, if the device 900 is in an RRC Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

Figure 10:
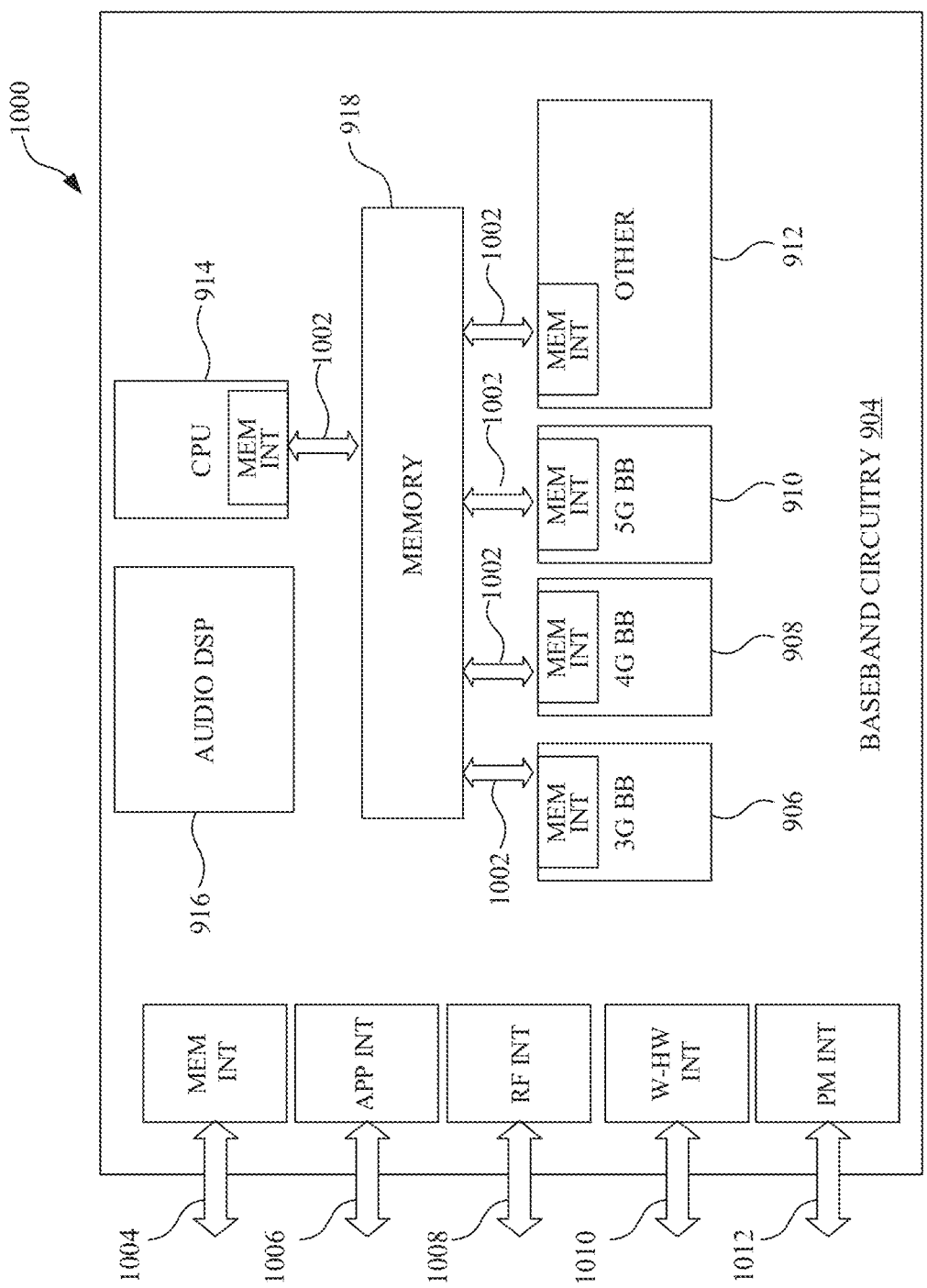
FIG. 10 illustrates example interfaces of baseband circuitry in accordance with some embodiments.

FIG. 10 illustrates example interfaces 1000 of baseband circuitry in accordance with some embodiments. As discussed above, the baseband circuitry 904 of FIG. 9 may include 3G baseband processor 906, 4G baseband processor 908, 5G baseband processor 910, other baseband processor(s) 912, CPU 914, and a memory 918 utilized by said processors. As illustrated, each of the processors may include a respective memory interface 1002 to send/receive data to/from the memory 918.

The baseband circuitry 904 may further include one or more interfaces to communicatively couple to other circuitries/devices, such as a memory interface 1004 (e.g., an interface to send/receive data to/from memory external to the baseband circuitry 904), an application circuitry interface 1006 (e.g., an interface to send/receive data to/from the application circuitry 902 of FIG. 9), an RF circuitry interface 1008 (e.g., an interface to send/receive data to/from RF circuitry 920 of FIG. 9), a wireless hardware connectivity interface 1010 (e.g., an interface to send/receive data to/from Near Field Communication (NFC) components, Bluetooth® components (e.g., Bluetooth® Low Energy), Wi-Fi® components, and other communication components), and a power management interface 1012 (e.g., an interface to send/receive power or control signals to/from the PMC 934.

Figure 11:
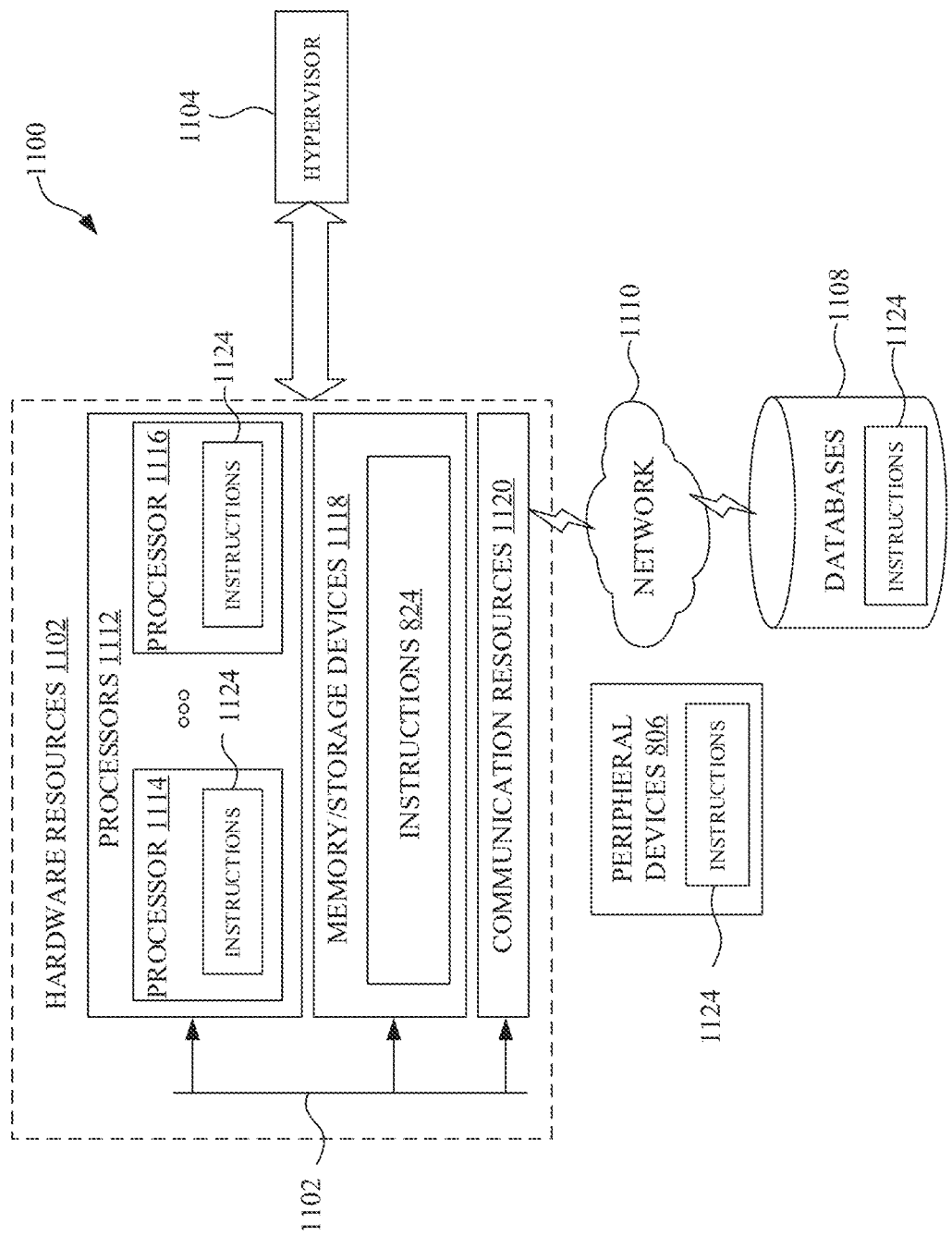
FIG. 11 illustrates components in accordance with some embodiments.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1112 (or processor cores), one or more memory/storage devices 1118, and one or more communication resources 1120, each of which may be communicatively coupled via a bus 1122. For embodiments where node virtualization (e.g., NFV) is utilized, a hypervisor 1104 may be executed to provide an execution environment for one or more network slices/sub-slices to utilize the hardware resources 1102.

The processors 1112 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1114 and a processor 1116.

The memory/storage devices 1118 may include main memory, disk storage, or any suitable combination thereof. The memory/storage devices 1118 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1120 may include interconnection or network interface components or other suitable devices to communicate with one or more peripheral devices 1106 or one or more databases 1108 via a network 1110. For example, the communication resources 1120 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1124 may include software, a program, an application, an applet, an app, or other executable code for causing at least any of the processors 1112 to perform any one or more of the methodologies discussed herein. The instructions 1124 may reside, completely or partially, within at least one of the processors 1112 (e.g., within the processor's cache memory), the memory/storage devices 1118, or any suitable combination thereof. Furthermore, any portion of the instructions 1124 may be transferred to the hardware resources 1102 from any combination of the peripheral devices 1106 or the databases 1108. Accordingly, the memory of the processors 1112, the memory/storage devices 1118, the peripheral devices 1106, and the databases 1108 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 12:
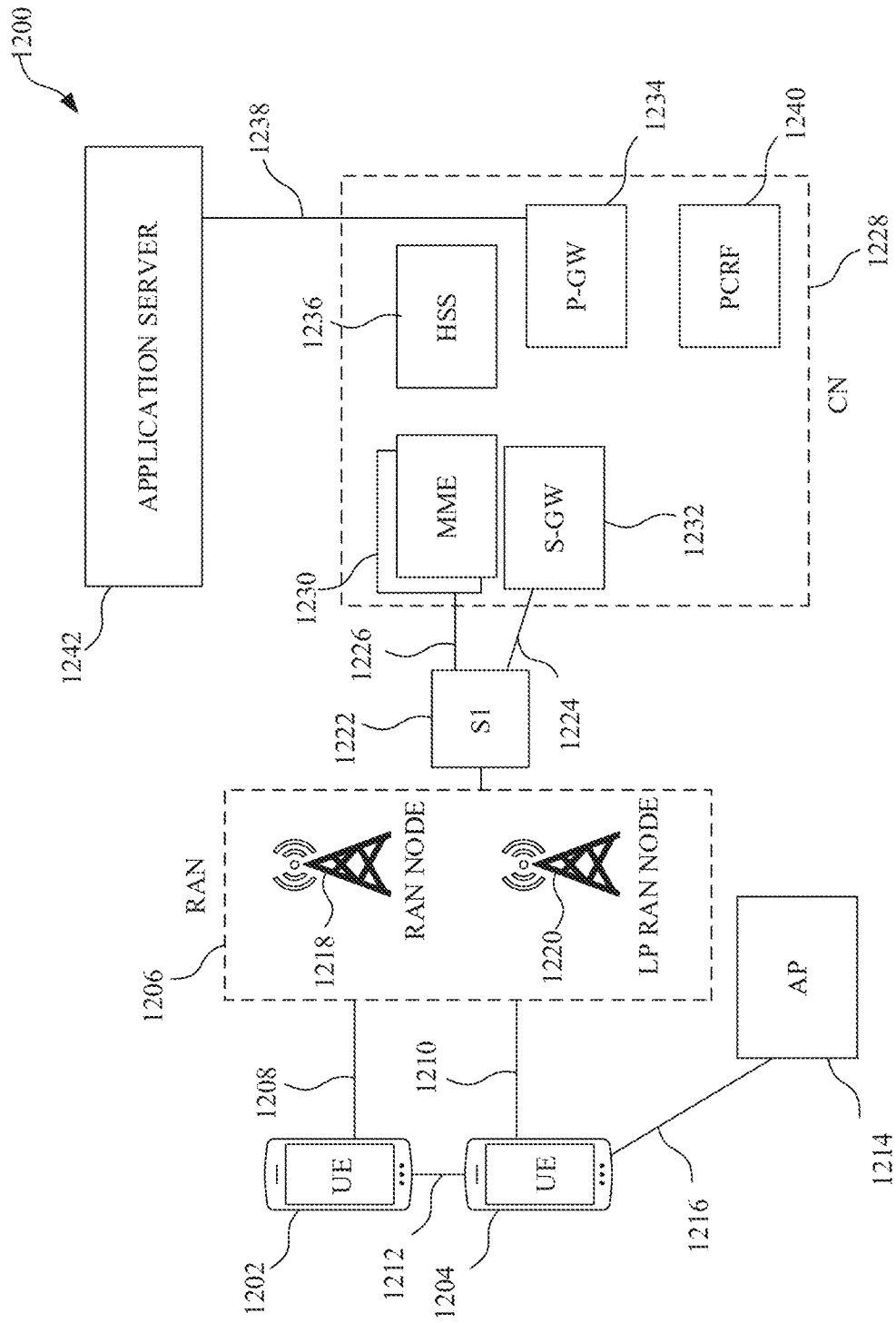
FIG. 12 illustrates an architecture of a wireless network in accordance with some embodiments.

FIG. 12 illustrates an architecture of a system 1200 of a network in accordance with some embodiments. The system 1200 includes one or more user equipment (UE), shown in this example as a UE 1202 and a UE 1204. The UE 1202 and the UE 1204 are illustrated as smartphones (e.g., handheld touchscreen mobile computing devices connectable to one or more cellular networks), but may also include any mobile or non-mobile computing device, such as Personal Data Assistants (PDAs), pagers, laptop computers, desktop computers, wireless handsets, or any computing device including a wireless communications interface.

In some embodiments, any of the UE 1202 and the UE 1204 can include an Internet of Things (IoT) UE, which can include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine- initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1202 and the UE 1204 may be configured to connect, e.g., communicatively couple, with a radio access network (RAN), shown as RAN 1206. The RAN 1206 may be, for example, an Evolved ETniversal Mobile Telecommunications System (ETMTS) Terrestrial Radio Access Network (E-UTRAN), a NextGen RAN (NG RAN), or some other type of RAN. The UE 1202 and the UE 1204 utilize connection 1208 and connection 1210, respectively, each of which includes a physical communications interface or layer (discussed in further detail below); in this example, the connection 1208 and the connection 1210 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1202 and the UE 1204 may further directly exchange communication data via a ProSe interface 1212. The ProSe interface 1212 may alternatively be referred to as a sidelink interface including one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1204 is shown to be configured to access an access point (AP), shown as AP 1214, via connection 1216. The connection 1216 can include a local wireless connection, such as a connection consistent with any IEEE 802.11 protocol, wherein the AP 1214 would include a wireless fidelity (WiFi®) router. In this example, the AP 1214 may be connected to the Internet without connecting to the core network of the wireless system (described in further detail below).

The RAN 1206 can include one or more access nodes that enable the connection 1208 and the connection 1210. These access nodes (ANs) can be referred to as base stations (BSs), NodeBs, evolved NodeBs (eNBs), next Generation NodeBs (gNB), RAN nodes, and so forth, and can include ground stations (e.g., terrestrial access points) or satellite stations providing coverage within a geographic area (e.g., a cell). The RAN 1206 may include one or more RAN nodes for providing macrocells, e.g., macro RAN node 1218, and one or more RAN nodes for providing femtocells or picocells (e.g., cells having smaller coverage areas, smaller user capacity, or higher bandwidth compared to macrocells), e.g., a low power (LP) RAN node such as LP RAN node 1220.

Any of the macro RAN node 1218 and the LP RAN node 1220 can terminate the air interface protocol and can be the first point of contact for the UE 1202 and the UE 1204. In some embodiments, any of the macro RAN node 1218 and the LP RAN node 1220 can fulfill various logical functions for the RAN 1206 including, but not limited to, radio network controller (RNC) functions such as radio bearer management, uplink and downlink dynamic radio resource management and data packet scheduling, and mobility management.

In accordance with some embodiments, the UE 1202 and the UE 1204 can be configured to communicate using Orthogonal Frequency-Division Multiplexing (OFDM) communication signals with each other or with any of the macro RAN node 1218 and the LP RAN node 1220 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can include a plurality of orthogonal sub carriers.

In some embodiments, a downlink resource grid can be used for downlink transmissions from any of the macro RAN node 1218 and the LP RAN node 1220 to the UE 1202 and the UE 1204, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1202 and the UE 1204. The physical downlink control channel (PDCCH) may carry information about the transport format and resource allocations related to the PDSCH channel, among other things. It may also inform the UE 1202 and the UE 1204 about the transport format, resource allocation, and H-ARQ (Hybrid Automatic Repeat Request) information related to the uplink shared channel. Typically, downlink scheduling (assigning control and shared channel resource blocks to the UE 1204 within a cell) may be performed at any of the macro RAN node 1218 and the LP RAN node 1220 based on channel quality information fed back from any of the UE 1202 and UE 1204. The downlink resource assignment information may be sent on the PDCCH used for (e.g., assigned to) each of the UE 1202 and the UE 1204.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1206 is communicatively coupled to a core network (CN), shown as CN 1228—via an S1 interface 1222. In embodiments, the CN 1228 may be an evolved packet core (EPC) network, a NextGen Packet Core (NPC) network, or some other type of CN. In this embodiment the S1 interface 1222 is split into two parts: the S1-U interface 1224, which carries traffic data between the macro RAN node 1218 and the LP RAN node 1220 and a serving gateway (S-GW), shown as S-GW 1132, and an S1-mobility management entity (MME) interface, shown as S1-MME interface 1226, which is a signaling interface between the macro RAN node 1218 and LP RAN node 1220 and the MME(s) 1230.

In this embodiment, the CN 1228 includes the MME(s) 1230, the S-GW 1232, a Packet Data Network (PDN) Gateway (P-GW) (shown as P-GW 1234), and a home subscriber server (HSS) (shown as HSS 1236). The MME(s) 1230 may be similar in function to the control plane of legacy Serving General Packet Radio Service (GPRS) Support Nodes (SGSN). The MME(s) 1230 may manage mobility aspects in access such as gateway selection and tracking area list management. The HSS 1236 may include a database for network users, including subscription-related information to support the network entities' handling of communication sessions. The CN 1228 may include one or several HSS 1236, depending on the number of mobile subscribers, on the capacity of the equipment, on the organization of the network, etc. For example, the HSS 1236 can provide support for routing/roaming, authentication, authorization, naming/addressing resolution, location dependencies, etc.

The S-GW 1232 may terminate the S1 interface 1222 towards the RAN 1206, and routes data packets between the RAN 1206 and the CN 1228. In addition, the S-GW 1232 May be a local mobility anchor point for inter-RAN node handovers and also may provide an anchor for inter-3 GPP mobility. Other responsibilities may include lawful intercept, charging, and some policy enforcement.

The P-GW 1234 may terminate an SGi interface toward a PDN. The P-GW 1234 may route data packets between the CN 1228 (e.g., an EPC network) and external networks such as a network including the application server 1242 (alternatively referred to as application function (AF)) via an Internet Protocol (IP) interface (shown as IP communications interface 1238). Generally, an application server 1242 may be an element offering applications that use IP bearer resources with the core network (e.g., ETMTS Packet Services (PS) domain, LTE PS data services, etc.). In this embodiment, the P-GW 1234 is shown to be communicatively coupled to an application server 1242 via an IP communications interface 1238. The application server 1242 can also be configured to support one or more communication services (e.g., Voice-over-Internet Protocol (VoIP) sessions, PTT sessions, group communication sessions, social networking services, etc.) for the UE 1202 and the UE 1204 via the CN 1228.

The P-GW 1234 may further be a node for policy enforcement and charging data collection. A Policy and Charging Enforcement Function (PCRF) (shown as PCRF 1240) is the policy and charging control element of the CN 1228. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1240 may be communicatively coupled to the application server 1242 via the P-GW 1234. The application server 1242 may signal the PCRF 1240 to indicate a new service flow and select the appropriate Quality of Service (QoS) and charging parameters. The PCRF 1240 may provision this rule into a Policy and Charging Enforcement Function (PCEF) (not shown) with the appropriate traffic flow template (TFT) and QoS class of identifier (QCI), which commences the QoS and charging as specified by the application server 1242.

ADDITIONAL EXAMPLES

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), including: generating a first information for the UE for transmission to a network device, wherein the first information is associated with a small data transmission (SDT) procedure in an inactive state of the UE; obtaining a first configuration information from the network device, wherein the first configuration information is determined with reference to the first information; determining whether to perform the SDT procedure in the inactive state according to the first configuration information; and in response to determining to perform the SDT procedure in the inactive state, performing the SDT procedure in the inactive state according to the first configuration information.

Example 2 is the method of Example 1, wherein the first information for the UE includes a UE-specific capability for the SDT procedure of the UE.

Example 3 is the method of Example 2, wherein the UE-specific capability for the SDT procedure indicates a type of the SDT procedure supported by the SDT procedure, and wherein the type of the SDT procedure supported by the UE includes at least one of a random access channel (RACH)-based SDT procedure and a configured grant (CG)-based SDT procedure.

Example 4 is the method of Example 2, wherein the UE-specific capability for the SDT procedure indicates a frequency factor supported by the SDT procedure of the UE.

Example 5 is the method of Example 4, wherein the frequency factor includes at least one of frequency location, frequency bandwidth and bandwidth part (BWP) for the SDT procedure.

Example 6 is the method of Example 2, wherein the UE-specific capability for the SDT procedure indicates one or more SDT modes supported by the SDT procedure of the UE.

Example 7 is the method of Example 6, wherein the one or more SDT modes supported by the SDT procedure are selected from a normal SDT mode, a power efficient SDT mode, and a basic SDT mode, wherein the SDT procedure includes a first SDT phase and a subsequent SDT phase, and wherein: in the normal SDT mode, the UE supports the first SDT phase and the subsequent SDT phase in the SDT procedure, and the UE supports the SDT procedure on an initial bandwidth part (BWP) and other BWPs, in the power efficient SDT mode, the UE supports the first SDT phase and the subsequent SDT phase, but a time period for the subsequent SDT phase in the power efficient SDT mode is limited, in the basic SDT mode, the UE only supports the first SDT phase, and the UE only supports the SDT procedure on the initial BWP.

Example 8 is the method of Example 7, wherein: if the SDT procedure is a random access channel (RACH)-based SDT procedure, the first SDT phase is considered to be completed when a RACH procedure is completed.

Example 9 is the method of Example 7, wherein: if the SDT procedure is a configured grant (CG)-based SDT procedure, the first SDT phase is considered to be completed when a CG transmission is completed.

Example 10 is the method of Example 2, wherein the UE-specific capability for the SDT procedure indicates a type of the UE from a plurality of types of the UE.

Example 11 is the method of Example 10, wherein the type of the UE corresponds to a UE-specific SDT configuration.

Example 12 is the method of Example 11, wherein the UE-specific SDT configuration includes one or more SDT modes supported by the SDT procedure, wherein the one or more SDT modes supported by the SDT procedure are selected from a normal SDT mode, a power efficient SDT mode, and a basic SDT mode, wherein the SDT procedure includes a first SDT phase and a subsequent SDT phase, and wherein: in the normal SDT mode, the UE supports the first SDT phase and the subsequent SDT phase in the SDT procedure, and the UE supports the SDT procedure on an initial bandwidth part (BWP) and other BWPs, in the power efficient SDT mode, the UE supports the first SDT phase and the subsequent SDT phase, but a time period for the subsequent SDT phase in the power efficient SDT mode is limited, the UE only supports the first SDT phase, and the UE only supports the SDT procedure on the initial BWP.

Example 13 is the method of any of Examples 2-12, wherein the first configuration information indicates a capability for the SDT procedure required by the network device, and wherein determining whether to perform the SDT procedure includes: determining whether the capability for the SDT procedure required by the network device is out of the UE-specific capability for the SDT procedure.

Example 14 is the method of Example 13, further including: in response to determining that the capability for the SDT procedure required by the network device is out of the UE-specific capability for the SDT procedure, triggering a reestablishment procedure for reporting that the first configuration information is wrong for the UE.

Example 15 is the method of Example 13, further including: in response to determining that the capability for the SDT procedure required by the network device is out of the UE-specific capability for the SDT procedure, triggering a resume procedure for entering into a connected state of the UE.

Example 16 is the method of Example 13, further including: in response to determining that the capability for the SDT procedure required by the network device is out of the UE-specific capability for the SDT procedure, triggering a release procedure for entering into an idle state of the UE.

Example 17 is the method of Example 1, wherein the first information for the UE includes a UE-specific preference for the SDT procedure.

Example 18 is the method of Example 17, wherein the SDT procedure includes a first SDT phase and a subsequent SDT phase, and wherein the UE-specific preference for the SDT procedure indicates a preferred time period for the subsequent SDT phase.

Example 19 is the method of Example 17, wherein the UE-specific preference for the SDT procedure indicates the UE's preference of leaving the SDT procedure or staying in the SDT procedure.

Example 20 is the method of Example 17, wherein the UE-specific preference for the SDT procedure indicates a SDT mode preferred by the SDT procedure of the UE, wherein the SDT mode preferred by the SDT procedure is selected from a normal SDT mode, a power efficient SDT mode, and a basic SDT mode, wherein the SDT procedure includes a first SDT phase and a subsequent SDT phase, and wherein: in the normal SDT mode, the UE supports the first SDT phase and the subsequent SDT phase in the SDT procedure, and the UE supports the SDT procedure on an initial bandwidth part (BWP) and other BWPs, in the power efficient SDT mode, the UE supports the first SDT phase and the subsequent SDT phase, but a time period for the subsequent SDT phase in the power efficient SDT mode is limited, in the basic SDT mode, the UE only supports the first SDT phase, and the UE only supports the SDT procedure on the initial BWP.

Example 21 is the method of Example 17, wherein the UE-specific preference for the SDT procedure indicates a traffic pattern of uplink data to be transmitted by the UE.

Example 22 is the method of any of Examples 17-21, wherein the first information for the UE includes a UE assistance information, and wherein the UE assistance information includes the UE-specific preference for the SDT procedure.

Example 23 is the method of Example 1, wherein the first configuration information indicates a maximum time period for the UE to perform the SDT procedure.

Example 24 is the method of Example 23, wherein determining whether to perform the SDT procedure includes: predicting a potential time period for the UE to perform the SDT procedure based on a traffic pattern of uplink data to be transmitted by the UE; and determining whether the potential time period is longer than the maximum time period.

Example 25 is the method of Example 24, further including: in response to determining that the potential time period is longer than the maximum time period, triggering a resume procedure for entering into a connected state of the UE.

Example 26 is the method of Example 24, further including: in response to determining that the potential time period is not longer than the maximum time period, performing the SDT procedure in the inactive state according to the first configuration information.

Example 27 is the method of Example 24, further including: configuring a timer for monitoring an actual time period to perform the SDT procedure.

Example 28 is a method for a network device, including: obtaining a first information for a user equipment (UE) from the UE, wherein the first information is associated with a small data transmission (SDT) procedure in an inactive state of the UE; and generating a first configuration information for transmission to UE, wherein the first configuration information is determined with reference to the first information, and wherein the first configuration information is used for determining whether to perform the SDT procedure in the inactive state by the UE and for configuring the SDT procedure by the UE.

Example 29 is the method of Example 28, wherein the first configuration information indicates a maximum time period for the UE to perform the SDT procedure.

Example 30 is an apparatus for a user equipment (UE), the apparatus including: one or more processors configured to perform steps of the method according to any of Examples 1-27.

Example 31 is an apparatus of a network device, the apparatus including: one or more processors configured to perform steps of the method according to any of Examples 28-29.

Example 32 is a computer readable medium having computer programs stored thereon which, when executed by one or more processors, cause an apparatus to perform steps of the method according to any of Examples 1-29.

Example 33 is an apparatus for a communication device, including means for performing steps of the method according to any of Examples 1-29.

Example 34 is a computer program product including computer programs which, when executed by one or more processors, cause an apparatus to perform steps of the method according to any of Examples 1-29.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method comprising:
generating a first information for transmission to a network device, wherein the first information is associated with a small data transmission (SDT) procedure in an inactive state of a user equipment (UE);
obtaining a first configuration information from the network device, wherein the first configuration information includes a value associated with a maximum duration to perform the SDT procedure;
determining to perform the SDT procedure in the inactive state according to the first configuration information;
in response to determining to perform the SDT procedure in the inactive state, initiating the SDT procedure in the inactive state according to the first configuration information; and
starting a timer with the value based on initiating the SDT procedure.

2. The method of claim 1, wherein the first information comprises a UE-specific capability for the SDT procedure of the UE.

3. The method of claim 2, wherein the UE-specific capability for the SDT procedure indicates a type of the SDT procedure supported by the SDT procedure, and wherein the type of the SDT procedure supported by the UE comprises a random access channel (RACH)-based SDT procedure or a configured grant (CG)-based SDT procedure.

4. The method of claim 2, wherein the UE-specific capability for the SDT procedure indicates a supported frequency factor for the SDT procedure.

5. The method of claim 4, wherein the frequency factor comprises a frequency location, a frequency bandwidth, or a bandwidth part (BWP) for the SDT procedure.

6. The method of claim 2, wherein the UE-specific capability for the SDT procedure indicates support for one or more SDT modes.

7. The method of claim 6, wherein the one or more SDT modes include a normal SDT mode, a power-efficient SDT mode, or a basic SDT mode, wherein the SDT procedure comprises a first SDT phase and a subsequent SDT phase, and wherein:
in the normal SDT mode, the first SDT phase and the subsequent SDT phase in the SDT procedure is supported, and the SDT procedure is supported on an initial bandwidth part (BWP) and other BWPs, in the power efficient SDT mode, the first SDT phase and the subsequent SDT phase are supported, but a time period for the subsequent SDT phase in the power efficient SDT mode is limited, in the basic SDT mode, only the first SDT phase is supported, and the SDT procedure is only supported on the initial BWP.

8. The method of claim 7, wherein:

the SDT procedure is a random access channel (RACH)-based SDT procedure and the first SDT phase is considered to be completed when a RACH procedure is completed; or the SDT procedure is a configured grant (CG)-based SDT procedure and the first SDT phase is considered to be completed when a CG transmission is completed.

9. The method of claim 2, wherein the UE-specific capability for the SDT procedure indicates a type of the UE, wherein the type of the UE corresponds to a UE-specific SDT configuration.

10. The method of claim 1, wherein the first configuration information indicates a capability for the SDT procedure required by the network device and the method further comprises:

determining to perform the SDT procedure based on the capability for the SDT procedure that.

11. The method of claim 1, wherein the first information comprises a UE-specific preference for the SDT procedure.

12. The method of claim 11, wherein the SDT procedure comprises a first SDT phase and a subsequent SDT phase, and wherein the UE-specific preference for the SDT procedure indicates a preferred time period for the subsequent SDT phase.

13. One or more non-transitory, computer-readable media having instructions that, when executed, cause circuitry to:

obtain first information for a user equipment (UE) from the UE, wherein the first information is associated with a small data transmission (SDT) procedure in an inactive state of the UE;

generate first configuration information for transmission to UE, wherein the first configuration information is determined with reference to the first information, and wherein the first configuration information is to configure a timer of the UE with a value associated with a maximum duration of the SDT procedure; and generate a signal to transmit the first configuration information to the UE.

14. The one or more non-transitory, computer-readable media of claim 13, wherein the first information is to indicate a configuration, supported by the UE, for SDT transmissions using configured grant or random access channel resources.

15. The one or more non-transitory, computer-readable media of claim 13, wherein the timer is to be started based on a transmission associated with the SDT procedure.

16. The method of claim 1, wherein the first information is to indicate a supported configuration for SDT transmissions using configured grant or random access channel resources.

17. The method of claim 1, further comprising:

receiving a radio resource control (RRC) message from the network device; and stopping the timer based on receiving the RRC message.

18. The method of claim 17, wherein the RRC message is an RRC release message.

19. The method of claim 1, further comprising:

detecting an expiration of the timer; and leaving the SDT procedure and transitioning to an idle state based on said detecting the expiration of the timer.

20. A method comprising:

obtaining first information for a user equipment (UE) from the UE, wherein the first information is associated with a small data transmission (SDT) procedure in an inactive state of the UE;

generating first configuration information for transmission to UE, wherein the first configuration information is determined with reference to the first information, and wherein the first configuration information is to configure a timer of the UE with a value associated with a maximum duration of the SDT procedure; and generating a signal to transmit the first configuration information to the UE.

* * * * *